United States Patent
Kim et al.

(10) Patent No.: US 9,155,936 B2
(45) Date of Patent: Oct. 13, 2015

(54) GOLF BALL

(75) Inventors: Hyun J. Kim, Carlsbad, CA (US); Hong G. Jeon, Carlsbad, CA (US)

(73) Assignee: Taylor Made Golf Company, Inc., Carlsbad, CA (US)

( * ) Notice: Subject to any disclaimer, the term of this patent is extended or adjusted under 35 U.S.C. 154(b) by 790 days.

(21) Appl. No.: 13/330,431

(22) Filed: Dec. 19, 2011

(65) Prior Publication Data

US 2013/0157778 A1 Jun. 20, 2013

(51) Int. Cl.
| | |
|---|---|
| A63B 37/06 | (2006.01) |
| A63B 37/00 | (2006.01) |
| C08L 77/10 | (2006.01) |
| A63B 45/00 | (2006.01) |

(52) U.S. Cl.
CPC ......... *A63B 37/0003* (2013.01); *A63B 37/0024* (2013.01); *A63B 37/0039* (2013.01); *A63B 37/0043* (2013.01); *A63B 37/0045* (2013.01); *A63B 37/0048* (2013.01); *A63B 37/0051* (2013.01); *A63B 37/0074* (2013.01); *A63B 37/0075* (2013.01); *A63B 37/0076* (2013.01); *A63B 37/0077* (2013.01); *C08L 77/10* (2013.01); *A63B 37/0031* (2013.01); *A63B 37/0033* (2013.01); *A63B 37/0049* (2013.01); *A63B 37/0064* (2013.01); *A63B 37/0065* (2013.01); *A63B 37/0092* (2013.01); *A63B 37/0096* (2013.01); *A63B 45/00* (2013.01); *A63B 2209/02* (2013.01)

(58) Field of Classification Search
CPC .................................................... A63B 37/0039
USPC ................................................. 473/373, 374
See application file for complete search history.

(56) References Cited

U.S. PATENT DOCUMENTS

| | | |
|---|---|---|
| 4,404,325 A | 9/1983 | Mason et al. |
| 4,431,193 A | 2/1984 | Nesbitt |
| 5,306,760 A | 4/1994 | Sullivan |
| 5,312,857 A | 5/1994 | Sullivan |
| 5,504,156 A | 4/1996 | Takezaki et al. |
| 5,789,475 A | 8/1998 | Chen |
| 5,973,046 A | 10/1999 | Chen et al. |
| 6,012,991 A * | 1/2000 | Kim et al. ............. 473/374 |

(Continued)

FOREIGN PATENT DOCUMENTS

| | | |
|---|---|---|
| EP | 342 244 | 11/1989 |
| JP | 04001231 | 1/1992 |

(Continued)

OTHER PUBLICATIONS

U.S. Appl. No. 12/645,328, filed Dec. 22, 2009, Kim et al.

(Continued)

*Primary Examiner* — Raeann Gorden
(74) *Attorney, Agent, or Firm* — Klarquist Sparkman, LLP

(57) ABSTRACT

This invention pertains to a golf ball which includes a core, optionally one or more intermediate layers; and an outer cover layer. The outer cover layer and/or one or more intermediate layers includes a blend of a) about 2 to about 40 wt % (based on the total weight of the blend composition) of an aramid polymer and b) about 60 to about 98 wt % (based on the total weight of the blend composition) of one or more additional polymer components. The blend composition has a melt flow index (MFI) from about 1 to about 80 g/10 min., a material hardness of about 30 to about 90 Shore D, and a flex modulus of about 10 to about 120 kpsi.

6 Claims, 2 Drawing Sheets

(56) References Cited

U.S. PATENT DOCUMENTS

| | | |
|---|---|---|
| 6,100,321 A | 8/2000 | Chen |
| 6,183,382 B1 | 2/2001 | Kim et al. |
| 6,329,458 B1 | 12/2001 | Takesue et al. |
| 6,368,237 B1 | 4/2002 | Sullivan |
| 6,416,424 B2 | 7/2002 | Sullivan |
| 6,419,594 B1 | 7/2002 | Nesbitt et al. |
| 6,503,156 B1 | 1/2003 | Sullivan |
| 6,506,130 B2 | 1/2003 | Sullivan |
| 6,562,906 B2 | 5/2003 | Chen |
| 6,616,552 B2 | 9/2003 | Takesue et al. |
| 6,653,382 B1 | 11/2003 | Statz et al. |
| 6,777,472 B1 | 8/2004 | Statz et al. |
| 6,815,480 B2 | 11/2004 | Statz et al. |
| 6,962,951 B1 | 11/2005 | Takesue et al. |
| 7,182,703 B2 | 2/2007 | Emerson et al. |
| 7,273,903 B2 | 9/2007 | Chen |
| 2001/0019971 A1 | 9/2001 | Hayashi et al. |
| 2001/0046906 A1 | 11/2001 | Rajagopalan et al. |
| 2002/0065149 A1 | 5/2002 | Tzivanis et al. |
| 2002/0065150 A1 | 5/2002 | Kato et al. |
| 2002/0193181 A1 | 12/2002 | Kennedy et al. |
| 2003/0008975 A1 | 1/2003 | Takesue et al. |
| 2003/0017888 A1 | 1/2003 | Higuchi et al. |
| 2003/0060307 A1 | 3/2003 | Umezawa et al. |
| 2003/0064828 A1 | 4/2003 | Kato |
| 2003/0148827 A1 | 8/2003 | Sullivan et al. |
| 2003/0158312 A1 | 8/2003 | Chen |
| 2004/0044136 A1 | 3/2004 | Kim |
| 2004/0106474 A1 | 6/2004 | Hayashi et al. |
| 2004/0132552 A1 | 7/2004 | Chen |
| 2004/0161623 A1 | 8/2004 | Domine et al. |
| 2004/0230006 A1 | 11/2004 | Voorheis et al. |
| 2004/0236030 A1 | 11/2004 | Kim et al. |
| 2004/0248669 A1* | 12/2004 | Kim et al. ............ 473/371 |
| 2005/0233836 A1 | 10/2005 | Watanabe et al. |
| 2005/0261424 A1 | 11/2005 | Snell et al. |
| 2005/0267240 A1 | 12/2005 | Chen |
| 2005/0288446 A1 | 12/2005 | Zieske et al. |
| 2006/0014898 A1 | 1/2006 | Kim et al. |
| 2006/0166762 A1 | 7/2006 | Kim et al. |
| 2010/0160081 A1 | 6/2010 | Kim et al. |
| 2010/0179002 A1 | 7/2010 | Kim et al. |

FOREIGN PATENT DOCUMENTS

| | | |
|---|---|---|
| JP | 5007635 | 1/1993 |
| JP | 6313075 | 11/1994 |
| JP | 09040826 | 2/1997 |
| JP | 10127822 | 5/1998 |
| JP | 10137364 | 5/1998 |
| JP | 10231400 | 9/1998 |
| JP | 11299933 | 11/1999 |
| JP | 2003-339910 | 12/2003 |
| JP | 2005-066040 | 3/2005 |
| JP | 2005-137743 | 6/2005 |
| JP | 9227737 | 9/2007 |

OTHER PUBLICATIONS

*Hawley's Condensed Chemical Dictionary*, 13th edition, pp. 206, 828, 2001.

Thain, *Science and Golf IV*, pp. 319-327, Jul. 2002.

* cited by examiner

GOLF BALL

BACKGROUND OF INVENTION

The present invention relates to sports equipment in general and more particularly to golf balls comprising a particular composition suitable for use in golf ball manufacture. In one embodiment, the present invention is used in the manufacture of a golf ball comprising a core, a cover layer and, optionally, one or more inner cover layers. In one preferred embodiment, a golf ball is disclosed in which the cover layer comprises the novel composition of the present invention. In another preferred embodiment, a golf ball is disclosed in which at least one intermediate layer comprises the novel composition of the present invention.

DESCRIPTION OF RELATED ART

The application of synthetic polymer chemistry to the field of sports equipment has revolutionized the performance of athletes in many sports. One sport in which this is particularly true is golf, especially as relates to advances in golf ball performance and ease of manufacture. For instance, the earliest golf balls consisted of a leather cover filled with wet feathers. These "feathery" golf balls were subsequently replaced with a single piece golf ball made from "gutta percha," a naturally occurring rubber-like material. In the early 1900's, the wound rubber ball was introduced, consisting of a solid rubber core around which rubber thread was tightly wound with a gutta percha cover.

More modern golf balls can be classified as one-piece, two-piece, three-piece or multi-layered golf balls. One-piece balls are molded from a homogeneous mass of material with a dimple pattern molded thereon. One-piece balls are inexpensive and very durable, but typically do not provide great distance because of relatively high spin and low velocity. Two-piece balls are made by molding a cover around a solid rubber core. These are the most popular types of balls in use today. In attempts to further modify the ball performance, especially in terms of the distance such balls travel, and the spin and the feel transmitted to the golfer through the club on striking the ball, the basic two piece ball construction has been further modified by the introduction of additional layers between the core and outer cover layer. If one additional layer is introduced between the core and outer cover layer a so called "three-piece ball" results, if two additional layers are introduced between the core and outer cover layer, a so called "four-piece ball" results, and so on.

Golf ball covers were previously made from balata rubber which was favored by some players because the softness of the cover allowed them to achieve spin rates sufficient to allow more precise control of ball direction and distance, particularly on shorter approach shots. However balata-covered balls, although exhibiting high spin and soft feel, were often deficient in terms of the durability of the cover which had a propensity to shear and also the velocity of the ball when it leaves the club face (which in turn affects the distance the ball travels).

The distance a golf ball travels is directly related to the coefficient of restitution ("C.O.R.") of the ball. The coefficient of restitution of a one-piece golf ball is in part a function of the ball's composition. In a two-piece or a multi-layered golf ball, the coefficient of restitution is a function of the properties of the core, the cover and any additional layer. While there are no United States Golf Association ("USGA") limitations on the coefficient of restitution values of a golf ball, the USGA requires that the golf ball cannot exceed an initial velocity of 255 feet/second. As a result, golf ball manufacturers generally seek to maximize the coefficient of restitution of a ball without violating the velocity limitation.

Accordingly, a variety of golf ball constructions have been developed in an attempt to provide spin rates and a feel approaching those of balata covered balls, while also providing a golf ball with a higher durability and overall distance. This has resulted in the emergence of balls, which have a solid rubber core, a cover, and one or more so called intermediate layers, as well as the application of new materials to each of these components.

A material which has been often utilized in more modern golf balls includes the various ionomer resins developed in the mid-1960's, by E.I. DuPont de Nemours and Co., and sold under the trademark SURLYN®. These ionomer resins have, to a large extent, replaced balata as a golf ball cover stock material. Preparation of such ionomers is well known, for example see U.S. Pat. No. 3,264,272. Generally speaking, commercial ionomers consist of a polymer of a mono-olefin, e.g., an alkene, with an unsaturated mono- or dicarboxylic acid having 3 to 12 carbon atoms. An additional monomer in the form of a mono- or dicarboxylic acid ester may also be incorporated in the formulation as a so-called "softening comonomer." The acid groups in the polymer are then neutralized to varying degrees by addition of a neutralizing agent in the form of a basic metal salt.

More recent developments in the field have attempted to utilize the various types of ionomers, both singly and in blend compositions to optimize the often conflicting golf ball performance requirements of high C.O.R. and ball velocity, and cover durability, with the need for a ball to spin and have a so-called soft feel on shorter iron shots. However, the incorporation of more acid in the ionomer and/or increasing its degree of neutralization results in a material with increased polarity, and hence one which is often less compatible with other potential blend materials. Also increasing the acid content of the ionomer while increasing C.O.R. may render the ball too hard and brittle causing a loss of shot feel, control (i.e., the ability to spin the ball) and may render the cover too brittle and prone to premature failure. Finally, the incorporation of more acid in the ionomer and/or increasing its degree of neutralization typically results in an increase in melt viscosity which in turn greatly decreases the processability of these resins. Attempts to mediate these effects by adding softer terpolymeric ionomers to high acid ionomer compositions to adjust the hardness and improve the shot "feel" often result in concomitant loss of C.O.R. and hence distance.

Another particular elastomeric material that provides for good performance when used in making ball covers and intermediate layers is a block copolymer having a first polymer block comprising an aromatic vinyl compound, and a second polymer block comprising a diene compound. However, it has been observed that covers incorporating these copolymers can suffer from cracks after being hit during play. During endurance testing of balls having covers incorporating such block copolymers, crack initiation and propagation was observed in the covers. This cracking leads to substantial deterioration in ball performance and long-term durability. These cracks also can initiate in an intermediate layer and subsequently propagate to a cover. Additionally, shear-cut resistance in the covers needs to be further improved for optimal performance.

Efforts to improve the durability of thermoplastic golf ball layers include the disclosure in U.S. Pat. No. 6,183,382 to Kim et al which describes the addition of a hardness-enhancing glass, carbon, aramid or metallic fibers to a soft, flexible resin having a hardness of about 25 shore D or less. The use of such soft flexible layers in a golf ball are useful when the ball construction also contains a fairly hard high compression core, however incorporation of soft flexible layers in golf ball constructions also having a soft core can lead to golf balls having insufficient hardness and resilience to achieve optimum performance.

In view of the above, it is apparent that golf ball cover and intermediate layers are needed that allow the optimization of golf ball performance properties by incorporating ionomers or block copolymers into the layers, while eliminating or reducing formation of cracks in the covers and intermediate layers and while maintaining sufficient hardness to be utilized in golf ball constructions with a soft or low compression core. The ball layers also should provide little or no processing and preparation difficulties beyond that provided by present layers. We have now surprisingly found that addition of an aramid polymer to a golf ball compositions comprising a block copolymer, an ethylene/unsaturated carboxylic acid copolymer or terpolymer, or an ionomer and any combination thereof results in an improvement in the flex modulus or hardness and impact endurance of the resulting golf ball component,

SUMMARY

This invention pertains to a golf ball which includes a core, optionally one or more intermediate layers; and an outer cover layer. The outer cover layer includes a blend of a) about 2 to about 40 wt % (based on the total weight of the blend composition) of an aramid polymer and b) about 60 to about 98 wt % (based on the total weight of the blend composition) of one or more additional polymer components. The blend composition has a melt flow index (MFI) from about 1 to about 80 g/10 min., a material hardness of about 30 to about 90 Shore D, and a flex modulus of about 10 to about 120 kpsi.

In one aspect the invention pertains to a golf ball which includes a core, one or more intermediate layers; and an outer cover layer. The one or more intermediate layers includes a blend of a) about 2 to about 40 wt % (based on the total weight of the blend composition) of an aramid polymer and b) about 60 to about 98 wt % (based on the total weight of the blend composition) of one or more additional polymer components. The blend composition has a melt flow index (MFI) from about 1 to about 80 g/10 min., a material hardness of about 30 to about 90 Shore D, and a flex modulus of about 10 to about 120 kpsi.

In another aspect the invention pertains to a two piece ball having only a core and an outer cover layer which has a thickness of about 0.015 to about 0.100 inches and a Shore D hardness as measured on the ball of from about 30 to about 75. The outer cover layer includes a blend of a) about 2 to about 40 wt % (based on the total weight of the blend composition) of an aramid polymer and b) about 60 to about 98 wt % (based on the total weight of the blend composition) of one or more additional polymer components. The blend composition has a melt flow index (MFI) from about 1 to about 80 g/10 min., a material hardness of about 30 to about 90 Shore D, and a flex modulus of about 10 to about 120 kpsi.

In another aspect, the invention pertains to a three piece golf ball having only a core, an outer cover layer which has a thickness from about 0.015 to about 0.100 inches and a Shore D hardness as measured on the ball of from about 30 to about 75, and an intermediate layer having a thickness from about 0.010 to about 0.400 inches and a Shore D hardness as measured on the ball of greater than about 25. The intermediate layer includes a blend a) about 2 to about 40 wt % (based on the total weight of the blend composition) of an aramid polymer and b) about 60 to about 98 wt % (based on the total weight of the blend composition) of one or more additional polymer components. The blend composition has a melt flow index (MFI) from about 1 to about 80 g/10 min., a material hardness of about 30 to about 90 Shore D, and a flex modulus of about 10 to about 120 kpsi.

In another aspect, the invention pertains to a four piece golf ball having only a core, an inner intermediate layer having a thickness from about 0.010 to about 0.400 inches and a Shore D hardness as measured on the ball of greater than about 25, an outer intermediate layer having a thickness from about 0.010 to about 0.400 inches and a Shore D hardness as measured on the ball of greater than about 25, and an outer cover layer having a thickness from about 0.015 to about 0.100 inches and a Shore D hardness as measured on the ball of from about 30 to about 75. The outer intermediate layer includes a blend of a) about 2 to about 40 wt % (based on the total weight of the blend composition) of an aramid polymer and b) about 60 to about 98 wt % (based on the total weight of the blend composition) of one or more additional polymer components. The blend composition has a melt flow index (MFI) from about 1 to about 80 g/10 min., a material hardness of about 30 to about 90 Shore D, and a flex modulus of about 10 to about 120 kpsi.

In another aspect, the invention pertains to a five piece golf ball having only a core, an inner intermediate layer having a thickness from about 0.010 to about 0.400 inches and a Shore D hardness as measured on the ball of greater than about 25, an intermediate layer having a thickness from about 0.010 to about 0.400 inches and a Shore D hardness as measured on the ball of greater than about 25, an outer intermediate layer having a thickness of about 0.010 to about 0.400 inches and a Shore D hardness as measured on the ball of greater than about 25, and an outer cover layer having a thickness from about 0.015 to about 0.100 inches and a Shore D hardness as measured on the ball of from about 30 to about 75. The outer intermediate layer includes a blend of a) about 2 to about 40 wt % (based on the total weight of the blend composition) of an aramid polymer and b) about 60 to about 98 wt % (based on the total weight of the blend composition) of one or more additional polymer components. The blend composition has a melt flow index (MFI) from about 1 to about 80 g/10 min., a material hardness of about 30 to about 90 Shore D, and a flex modulus of about 10 to about 120 kpsi.

BRIEF DESCRIPTION OF DRAWINGS

Although FIGS. 1 and 2 illustrate only three- and four-piece golf ball constructions, golf balls of the present invention may comprise from 1 to at least 5 intermediate layer(s), preferably from 1 to 3 intermediate layer(s), more preferably from 1 to 2 intermediate layer(s).

DETAILED DESCRIPTION

Figure 1:
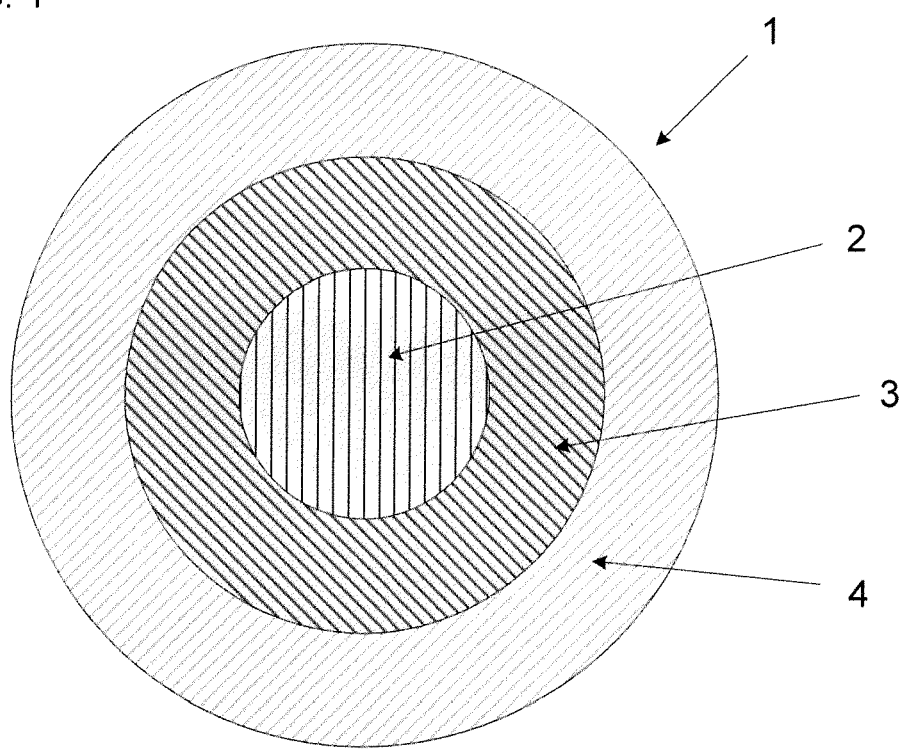
FIG. 1 illustrates a three-piece golf ball 1 comprising a solid center or core 2, an intermediate layer 3, and an outer cover layer 4.
Figure 2:
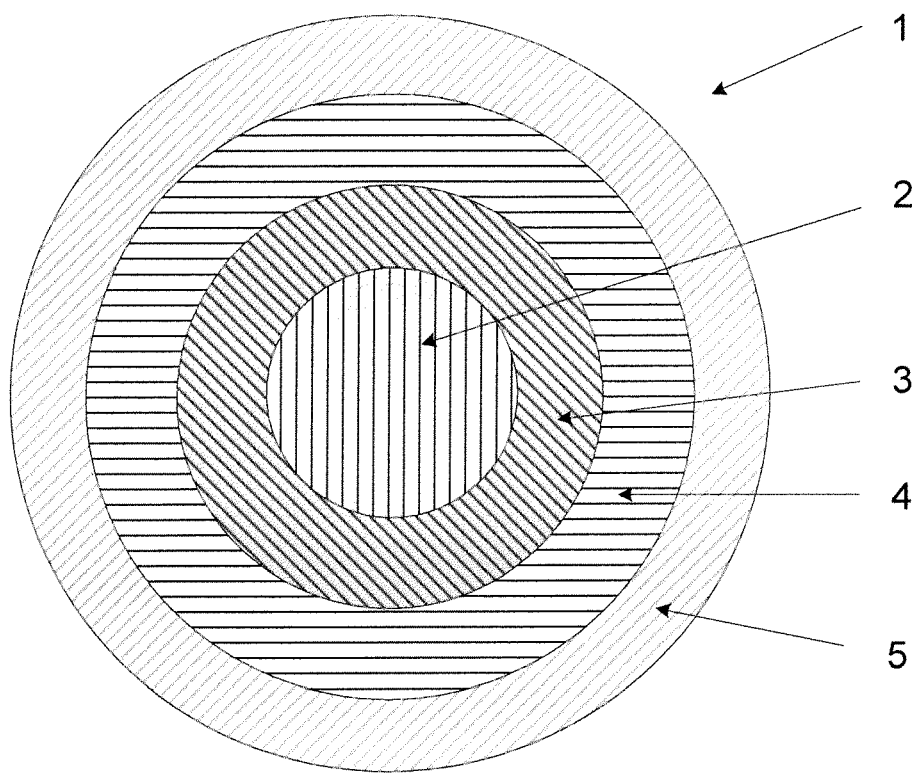
FIG. 2 illustrates a 4-piece golf ball 1 comprising a core 2, and an outer cover layer 5, an inner intermediate layer 3, and an outer intermediate layer 4.

Any numerical values recited herein include all values from the lower value to the upper value in increments of one unit provided that there is a separation of at least 2 units between any lower value and any higher value. As an example, if it is stated that the amount of a component or a value of a process variable is from 1 to 90, preferably from 20 to 80, more preferably from 30 to 70, it is intended that values such as 15 to 85, 22 to 68, 43 to 51, 30 to 32 etc. are expressly enumerated in this specification. For values, which have less than one unit difference, one unit is considered to be 0.1, 0.01, 0.001, or 0.0001 as appropriate. Thus all possible combinations of numerical values between the lowest value and the highest value enumerated herein are said to be expressly stated in this application.

The term "bimodal polymer" refers to a polymer comprising two main fractions and more specifically to the form of the polymers molecular weight distribution curve, i.e., the appearance of the graph of the polymer weight fraction as function of its molecular weight. When the molecular weight distribution curves from these fractions are superimposed into the molecular weight distribution curve for the total resulting polymer product, that curve will show two maxima or at least be distinctly broadened in comparison with the curves for the individual fractions. Such a polymer product is called bimodal. It is to be noted here that also the chemical compositions of the two fractions may be different.

As used herein, the term "block copolymer" is intended to mean a polymer comprising two or more homopolymer subunits linked by covalent bonds. The union of the homopolymer subunits may require an intermediate non-repeating subunit, known as a junction block. Block copolymers with two or three distinct blocks are called diblock copolymers and triblock copolymers, respectively.

The term "core" is intended to mean the elastic center of a golf ball. The core may be a unitary core having a center it may have one or more "core layers" of elastic material, which are usually made of rubbery material such as diene rubbers.

The term "cover layer" is intended to mean the outermost layer of the golf ball; this is the layer that is directly in contact with paint and/or ink on the surface of the golf ball. If the cover consists of two or more layers, only the outermost layer is designated the cover layer, and the remaining layers (excluding the outermost layer) are commonly designated intermediate layers as herein defined. The term "outer cover layer" as used herein is used interchangeably with the term "cover layer."

The term "fiber" as used herein is a general term for which the definition given in *Engineered Materials Handbook*, Vol. 2, "Engineering Plastics", published by A.S.M. International, Metals Park, Ohio, USA, is relied upon to refer to filamentary materials with a finite length that is at least 100 times its diameter, which is typically 0.10 to 0.13 mm (0.004 to 0.005 in.). Fibers can be continuous or specific short lengths (discontinuous), normally no less than 3.2 mm (⅛ in.). Although fibers according to this definition are preferred, fiber segments, i.e., parts of fibers having lengths less than the aforementioned are also considered to be encompassed by the invention. Thus, the terms "fibers" and "fiber segments" are used herein. In the claims appearing at the end of this disclosure in particular, the expression "fibers or fiber segments" and "fiber elements" are used to encompass both fibers and fiber segments.

The term "hydrocarbyl" is intended to mean any aliphatic, cycloaliphatic, aromatic, aryl substituted aliphatic, aryl substituted cycloaliphatic, aliphatic substituted aromatic, or cycloaliphatic substituted aromatic groups. The aliphatic or cycloaliphatic groups are preferably saturated. Likewise, the term "hydrocarbyloxy" means a hydrocarbyl group having an oxygen linkage between it and the carbon atom to which it is attached.

The term "intermediate layer" may be used interchangeably herein with the terms "mantle layer" or "inner cover layer" and is intended to mean any layer(s) in a golf ball disposed between the core and the outer cover layer. Should a ball have more than one intermediate layer, these may be distinguished as "inner intermediate layer" or "inner mantle layer" which terms may be used interchangeably to refer to the intermediate layer nearest the core and furthest from the outer cover, as opposed to the "outer intermediate layer" or "outer mantle layer" which terms may also used interchangeably to refer to the intermediate layer furthest from the core and closest to the outer cover, and if there are three intermediate layers, these may be distinguished as "inner intermediate layer" or "inner mantle layer" which terms are used interchangeably to refer to the intermediate or mantle layer nearest the core and furthest from the outer cover, as opposed to the "outer intermediate layer" or "outer mantle layer" which terms are also used interchangeably to refer to the intermediate layer further from the core and closer to the outer cover, and as opposed to the "intermediate layer" or "intermediate mantle layer" which terms are also used interchangeably to refer to the intermediate layer between the inner intermediate layer and the outer intermediate layer.

The term "(meth)acrylic acid copolymers" is intended to mean copolymers of methacrylic acid and/or acrylic acid.

The term "(meth)acrylate" is intended to mean an ester of methacrylic acid and/or acrylic acid.

The term "partially neutralized" is intended to mean an ionomer with a degree of neutralization of less than 100 percent. The term "highly neutralized" is intended to mean an ionomer with a degree of neutralization of greater than 50 percent. The term "fully neutralized" is intended to mean an ionomer with a degree of neutralization of 100 percent.

The term "prepolymer" as used herein is intended to mean any polymeric material that can be further processed to form a final polymer material of a manufactured golf ball, such as, by way of example and not limitation, a polymerized or partially polymerized material that can undergo additional processing, such as crosslinking.

The term "sports equipment" refers to any item of sports equipment such as sports clothing, boots, sneakers, clogs, sandals, slip on sandals and shoes, golf shoes, tennis shoes, running shoes, athletic shoes, hiking shoes, skis, ski masks, ski boots, cycling shoes, soccer boots, golf clubs, golf bags, and the like.

The term "thermoplastic" as used herein is intended to mean a material that is capable of softening or melting when heated and of hardening again when cooled. Thermoplastic polymer chains often are not cross-linked or are lightly crosslinked using a chain extender, but the term "thermoplastic" as used herein may refer to materials that initially act as thermoplastics, such as during an initial extrusion process or injection molding process, but which also may be crosslinked, such as during a compression molding step to form a final structure.

The term "thermoset" as used herein is intended to mean a material that crosslinks or cures via interaction with as crosslinking or curing agent. Crosslinking may be induced by energy, such as heat (generally above 200° C.), through a chemical reaction (by reaction with a curing agent), or by irradiation. The resulting composition remains rigid when set, and does not soften with heating. Thermosets have this property because the long-chain polymer molecules crosslink with each other to give a rigid structure. A thermoset material cannot be melted and re-molded after it is cured. Thus thermosets do not lend themselves to recycling unlike thermoplastics, which can be melted and re-molded.

The term "thermoplastic polyurethane" as used herein is intended to mean a material prepared by reaction of a prepared by reaction of a diisocyanate with a polyol, and optionally addition of a chain extender.

The term "thermoplastic polyurea" as used herein is intended to mean a material prepared by reaction of a prepared by reaction of a diisocyanate with a polyamine, with optionally addition of a chain extender.

The term "thermoset polyurethane" as used herein is intended to mean a material prepared by reaction of a diisocyanate with a polyol (or a prepolymer of the two), and a curing agent.

The term "thermoset polyurea" as used herein is intended to mean a material prepared by reaction of a diisocyanate with a polyamine (or a prepolymer of the two) and a curing agent.

The term "unimodal polymer" refers to a polymer comprising one main fraction and more specifically to the form of the polymers molecular weight distribution curve, i.e., the molecular weight distribution curve for the total polymer product shows only a single maximum.

The term "urethane prepolymer" as used herein is intended to mean the reaction product of diisocyanate and a polyol.

The term "urea prepolymer" as used herein is intended to mean the reaction product of a diisocyanate and a polyamine.

The term "zwitterion" as used herein is intended to mean a form of the compound having both an amine group and carboxylic acid group, where both are charged and where the net charge on the compound is neutral.

The present invention can be used in forming golf balls of any desired size. "The Rules of Golf" by the USGA dictate that the size of a competition golf ball must be at least 1.680 inches in diameter; however, golf balls of any size can be used for leisure golf play. The preferred diameter of the golf balls is from about 1.680 inches to about 1.800 inches. The more preferred diameter is from about 1.680 inches to about 1.760 inches. A diameter of from about 1.680 inches to about 1.740 inches is most preferred; however diameters anywhere in the range of from 1.70 to about 2.0 inches can be used. Oversize golf balls with diameters above about 1.760 inches to as big as 2.75 inches are also within the scope of the invention.

In order to increase the flexural modulus or hardness and to improve the impact endurance of compositions comprising styrenic block copolymers or ionomeric polymers for use in golf ball applications, we have surprisingly found that this can be accomplished by the addition of a solid aramid polymer (in the form of a powder or fiber) to either; 1) a styrenic block copolymer; 2) an ionomer; 3) an acidic polymer precursor of an ionomer (followed by subsequent or in-situ neutralization); 4) a blend of an ionomer and additional polymer components including styrenic block copolymers, or 5) to a multi component blend composition ("MCBC") comprising an acidic polymer, a styrenic block copolymer and a basic metal salt neutralizing agent.

The term "aramid" as used in the present specification means a synthetic polymeric resin generally designated in the art as an aromatic polycarbonamide. The polycarbonamides may be synthesized from the monomers 1,4-phenylene-diamine (para-phenylenediamine) and terephthaloyl chloride in a condensation reaction yielding hydrochloric acid as a byproduct as in the example shown below.

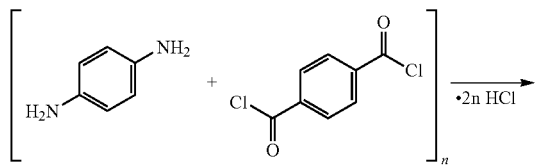

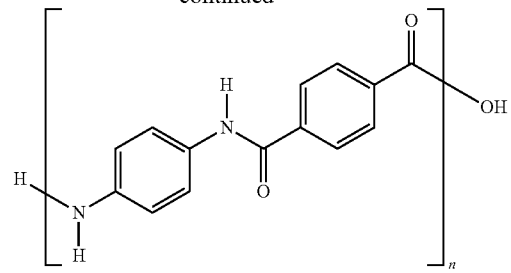

Aramid is more fully disclosed in Technical Disclosure T950,008 (95 OG 6, published Sep. 7, 1976, and based on an application originally filed Feb. 18, 1975) and U.S. Pat. Nos. 3,652,510; 3,699,085; and 3,673,143. as well as the divisional patent thereof, U.S. Pat. No. 3,817,941, the disclosures of each of which are incorporated herein by reference.

For the purposes of the present invention an aramid polymer is a long-chain synthetic polyamide in which at least 85% of the amide linkages, (—CO—NH—) are attached directly to two aromatic rings. A preferred series of polymers are those characterized by recurring units of the formula

wherein $Ar_1$ and $Ar_2$ independently represent p-phenylene, m-phenylene, halo-substituted p-phenylene, halo-substituted m-phenylene, 4,4-substituted diphenyl methane, or mixtures thereof. Preferably the aramid polymers are poly(para-phenyleneterephthalamide), poly(meta-phenyleneisophthalamide), and copolymers and combinations thereof and poly (para-phenyleneterephthalamide) and copolymers and combinations thereof are most preferred In addition, although the aramid or aromatic polycarbonamide may consist primarily of carbonamide links (—CONH—) and aromatic ring nuclei, conforming to the formula above, the polymer may contain up to 20 mole percent and preferably 0 to 5 mole percent of non-conforming comonomer units which provide different units in the polycarbonamide chain such as aromatic carbonamide units whose chain extending bonds are coaxial or parallel and oppositely directed.

Suitable aramid polymers are commercially available under tradenames including Kevlar® (E.I. du Pont de Nemours and Company), Twaron® (Akzo Nobel), Technora (Teijin), Nomex® and Nomex Z200 (E.I. du Pont de Nemours and Company), Teijinconex (Teijin), and Apial (Unitika).

The aramid polymer may be used in solid form in the form of a powder or fiber with a powder being more preferred with the type of aramid selected based on the properties of the polymer component(s) to which it is to be added.

Fibers that are contemplated to be usable with the invention include those described in *Handbook of Composites*, Vol. 4, "Fabrication of Composites", by A. Kelly and F. T. Mileiko, published by Elsevier Science Publishers B.V., Amsterdam, Netherlands, 1983.

Materials suitable for use as the hardness-enhancing materials which are appropriate for the mantle of the golf ball according to the invention include aramid fibers, such as Kevlar, including types PRD 29 and PRD 49. The form of the fibers or fiber segments is very important and has a significant effect on final physical properties of the product, composite material. The fiber or fiber segment form can be very short, as with milled glass fibers, which would be less than 0.5 mm (0.02 in.) in length; short chopped fibers to about 2 mm (0.08 in.); and long chopped fibers to 10 to 50 mm (0.4 to 2 in.). The greater the fiber content, the greater the flexural modulus. This effect is true no matter what form of fiber element is used. The advantage of long fiber length is that with higher fiber loadings, some physical properties, such as tensile and flexural strength, become more related to those of the reinforcement. The fiber elements used for the invention can be either a surface-treated fiber or a non-treated fiber.

Processing

The fiber elements can be blended with the elastomer, or other soft, flexible resin, by any dry mixer or dry mixing, Banbury type mixer, two-roll mill or extruder, prior to being used for the mantle application. Additional materials may also be added to the polymer/fiber composite, such as dyes, antioxidants, stabilizers, processing aids, plasticizers, and other reinforcing materials, such as organic or inorganic fillers.

A variety of conventional molding methods can be used, such as compression molding, retractable pin injection molding, fixed pin injection molding, thermoforming, transfer molding, or a combination of these methods.

One preferred material to which the aramid polymer may be added and which also may be used as a separate component of the cover layer or intermediate layer of the golf balls of the present invention is a block copolymer including di and triblock copolymers incorporating a first polymer block having an aromatic vinyl compound, and a second polymer block having an olefinic and/or conjugated diene compound. Preferred aromatic vinyl compounds include styrene, α-methylstyrene, o-, m- or p-methylstyrene, 4-propylstyrene, 1,3-dimethylstyrene, vinylnaphthalene and vinylanthracene. In particular, styrene and α-methylstyrene are preferred. These aromatic vinyl compounds can each be used alone, or can be used in combination of two or more kinds. The aromatic vinyl compound is preferably contained in the block copolymer in an amount of from 5 to 75% by weight, and more preferably from 10 to 65% by weight.

The conjugated diene compound, that constitutes another polymer block in the block copolymer can include for example, 1,3-butadiene, isoprene, 2,3-dimethyl-1,3-butadiene, 1,3-pentadiene and 1,3-hexadiene. In particular, isoprene and 1,3-butadiene are preferred. These conjugated diene compounds can each be used alone, or can be used in combination of two or more kinds.

Preferred block copolymers include the styrenic block copolymers such as styrene-butadiene-styrene (SBS), styrene-ethylene-butylene-styrene, (SEBS) and styrene-ethylene-propylene-styrene (SEPS). Commercial examples include SEPTON marketed by Kuraray Company of Kurashiki, Japan; TOPRENE by Kumho Petrochemical Co., Ltd and KRATON marketed by Kraton Polymers. Also included are functionalized styrenic block copolymers, including those where the block copolymer incorporates a first polymer block having an aromatic vinyl compound, a second polymer block having a conjugated diene compound and a hydroxyl group located at a block copolymer, or its hydrogenation product. One such functionalized styrenic block copolymer is SEPTON HG-252.

Another preferred material to which the aramid polymer may be added and which also may be used as a separate component of the cover layer or intermediate layer of the golf balls of the present invention is an acidic polymer that incorporates at least one type of an acidic functional group. Examples of such polymers suitable for use as include, but are not limited to, ethylene/(meth)acrylic acid copolymers and ethylene/(meth)acrylic acid/alkyl (meth)acrylate terpolymers, or ethylene and/or propylene maleic anhydride copolymers and terpolymers. Examples of such polymers which are commercially available include, but are not limited to, the Escor® 5000, 5001, 5020, 5050, 5070, 5100, 5110 and 5200 series of ethylene-acrylic acid copolymers sold by Exxon Mobil, the PRIMACOR® 1321, 1410, 1410-XT, 1420, 1430, 2912, 3150, 3330, 3340, 3440, 3460, 4311, 4608 and 5980 series of ethylene-acrylic acid copolymers sold by The Dow Chemical Company, Midland, Mich. and the ethylene-methacrylic acid copolymers such as Nucrel 599, 699, 0903, 0910, 925, 960, 2806, and 2906 sold by DuPont Also included are the so called bimodal ethylene/carboxylic acid polymers as described in U.S. Pat. No. 6,562,906, the contents of which are incorporated herein by reference. These polymers comprise a first component comprising an ethylene/α,β-ethylenically unsaturated $C_{3-8}$ carboxylic acid high copolymer, particularly ethylene (meth)acrylic acid copolymers and ethylene, alkyl (meth)acrylate, (meth)acrylic acid terpolymers, having a weight average molecular weight, Mw, of about 80,000 to about 500,000, and a second component comprising an ethylene/α,β-ethylenically unsaturated $C_{3-8}$ carboxylic acid copolymers, particularly ethylene/(meth) acrylic acid copolymers having weight average molecular weight, Mw, of about 2,000 to about 30,000.

Another preferred material to which the aramid polymer may be added and which also may be used as a separate component of the cover layer or intermediate layer of the golf balls of the present invention is an ionomer resin. One family of such resins was developed in the mid-1960's, by E.I. DuPont de Nemours and Co., and is sold under the trademark SURLYN®. Preparation of such ionomers is well known, for example see U.S. Pat. No. 3,264,272. Generally speaking, most commercial ionomers are unimodal and consist of a polymer of a mono-olefin, e.g., an alkene, with an unsaturated mono- or dicarboxylic acids having 3 to 12 carbon atoms. An additional monomer in the form of a mono- or dicarboxylic acid ester may also be incorporated in the formulation as a so-called "softening comonomer". The incorporated carboxylic acid groups are then neutralized by a basic metal ion salt, to form the ionomer. The metal cations of the basic metal ion salt used for neutralization include $Li^+$, $Na^+$, $K^+$, $Zn^{2+}$, $Ca^{2+}$, $Co^{2+}$, $Ni^{2+}$, $cu^{2+}$, $Pb^{2+}$, and $Mg^{2+}$, with the $Li^+$, $Na^+$, $Ca^{2+}$, $Zn^{2+}$, and $Mg^{2+}$ being preferred. The basic metal ion salts include those of for example formic acid, acetic acid, nitric acid, and carbonic acid, hydrogen carbonate salts, oxides, hydroxides, and alkoxides.

The first commercially available ionomer resins contained up to 16 weight percent acrylic or methacrylic acid, although it was also well known at that time that, as a general rule, the hardness of these cover materials could be increased with increasing acid content. Hence, in Research Disclosure 29703, published in January 1989, DuPont disclosed ionomers based on ethylene/acrylic acid or ethylene/methacrylic acid containing acid contents of greater than 15 weight percent. In this same disclosure, DuPont also taught that such so called "high acid ionomers" had significantly improved stiffness and hardness and thus could be advantageously used in golf ball construction, when used either singly or in a blend with other ionomers.

More recently, high acid ionomers can be ionomer resins with acrylic or methacrylic acid units present from 16 wt. % to about 35 wt. % in the polymer. Generally, such a high acid ionomer will have a flexural modulus from about 50,000 psi to about 125,000 psi.

Ionomer resins further comprising a softening comonomer, present from about 10 wt. % to about 50 wt. % in the polymer, have a flexural modulus from about 2,000 psi to about 10,000 psi, and are sometimes referred to as "soft" or "very low modulus" ionomers. Typical softening comonomers include n-butyl acrylate, iso-butyl acrylate, n-butyl methacrylate, methyl acrylate and methyl methacrylate.

Today, there are a wide variety of commercially available ionomer resins based both on copolymers of ethylene and (meth)acrylic acid or terpolymers of ethylene and (meth) acrylic acid and (meth)acrylate, many of which are be used as a golf ball component. The properties of these ionomer resins can vary widely due to variations in acid content, softening comonomer content, the degree of neutralization, and the type of metal ion used in the neutralization. The full range commercially available typically includes ionomers of polymers of general formula, E/X/Y polymer, wherein E is ethylene, X is a $C_3$ to $C_8$ $\alpha,\beta$ ethylenically unsaturated carboxylic acid, such as acrylic or methacrylic acid, and is present in an amount from about 2 to about 30 weight % of the E/X/Y copolymer, and Y is a softening comonomer selected from the group consisting of alkyl acrylate and alkyl methacrylate, such as methyl acrylate or methyl methacrylate, and wherein the alkyl groups have from 1-8 carbon atoms, Y is in the range of 0 to about 50 weight % of the E/X/Y copolymer, and wherein the acid groups present in said ionomeric polymer are partially neutralized with a basic metal salt with metal ions selected from the group consisting of lithium, sodium, potassium, magnesium, calcium, barium, lead, tin, zinc or aluminum, or a combination of such cations.

The ionomer may also be a so-called bimodal ionomer as described in U.S. Pat. No. 6,562,906 (the entire contents of which are herein incorporated by reference). These ionomers are bimodal as they are prepared from blends comprising polymers of different molecular weights. Specifically they include bimodal polymer blend compositions comprising:

a) a high molecular weight component having a weight average molecular weight, Mw, of about 80,000 to about 500,000 and comprising one or more ethylene/$\alpha,\beta$-ethylenically unsaturated $C_{3-8}$ carboxylic acid copolymers and/or one or more ethylene, alkyl (meth)acrylate, (meth)acrylic acid terpolymers; said high molecular weight component being partially neutralized with a basic metal salt with metal ions selected from the group consisting of lithium, sodium, zinc, calcium, magnesium, and a mixture of any these; and b) a low molecular weight component having a weight average molecular weight, Mw, of about from about 2,000 to about 30,000 and comprising one or more ethylene/$\alpha,\beta$-ethylenically unsaturated $C_{3-8}$ carboxylic acid copolymers and/or one or more ethylene, alkyl (meth)acrylate, (meth)acrylic acid terpolymers; said low molecular weight component being partially neutralized with a basic metal salt with metal ions selected from the group consisting of lithium, sodium, potassium, magnesium, calcium, barium, lead, tin, zinc or aluminum, and a mixture of any these.

In addition to the unimodal and bimodal ionomers, also included are the so-called "modified ionomers" examples of which are described in U.S. Pat. Nos. 6,100,321, 6,329,458 and 6,616,552 and U.S. Patent Publication US 2003/0158312 A1, the entire contents of all of which are herein incorporated by reference.

The modified unimodal ionomers may be prepared by mixing:

a) an ionomeric polymer comprising ethylene, from 5 to 25 weight percent (meth)acrylic acid, and from 0 to 40 weight percent of a (meth)acrylate monomer, said ionomeric polymer neutralized with a basic metal salt with metal ions selected from the group consisting of lithium, sodium, potassium, magnesium, calcium, barium, lead, tin, zinc or aluminum, and any and all mixtures thereof; and b) from about 5 to about 40 weight percent (based on the total weight of said modified ionomeric polymer) of one or more fatty acids or metal salts of said fatty acid, the metal salt having metal ions selected from the group consisting of lithium, sodium, potassium, magnesium, calcium, barium, lead, tin, zinc or aluminum, and any and all mixtures thereof; and the fatty acid preferably being stearic acid.

The modified bimodal ionomers, which are ionomers derived from the earlier described bimodal ethylene/carboxylic acid polymers (as described in U.S. Pat. No. 6,562,906, the entire contents of which are herein incorporated by reference), are prepared by mixing;

a) a high molecular weight component having a weight average molecular weight, Mw, of about 80,000 to about 500,000 and comprising one or more ethylene/$\alpha,\beta$-ethylenically unsaturated $C_{3-8}$ carboxylic acid copolymers and/or one or more ethylene, alkyl (meth)acrylate, (meth)acrylic acid terpolymers; said high molecular weight component being partially neutralized with a basic metal salt with metal ions selected from the group consisting of lithium, sodium, potassium, magnesium, calcium, barium, lead, tin, zinc or aluminum, and any and all mixtures thereof; and b) a low molecular weight component having a weight average molecular weight, Mw, of about from about 2,000 to about 30,000 and comprising one or more ethylene/$\alpha,\beta$-ethylenically unsaturated $C_{3-8}$ carboxylic acid copolymers and/or one or more ethylene, alkyl (meth)acrylate, (meth)acrylic acid terpolymers; said low molecular weight component being partially neutralized with a basic metal salt with metal ions selected from the group consisting of lithium, sodium, potassium, magnesium, calcium, barium, lead, tin, zinc or aluminum, and any and all mixtures thereof; and c) from about 5 to about 40 weight percent (based on the total weight of said modified ionomeric polymer) of one or more fatty acids or metal salts of said fatty acid, the metal salt having metal ions selected from the group consisting of lithium, sodium, potassium, magnesium, calcium, barium, lead, tin, zinc or aluminum, and any and all mixtures thereof; and the fatty acid preferably being stearic acid.

The fatty or waxy acid salts utilized in the various modified ionomers are composed of a chain of alkyl groups containing from about 4 to 75 carbon atoms (usually even numbered) and characterized by a —COOH terminal group. The fatty or waxy acids utilized to produce the fatty or waxy acid salts modifiers may be saturated or unsaturated, and they may be present in solid, semi-solid or liquid form.

Examples of suitable saturated fatty acids, i.e., fatty acids in which the carbon atoms of the alkyl chain are connected by single bonds, include but are not limited to stearic acid ($CH_3(CH_2)_{16}COOH$), palmitic acid ($CH_3(CH_2)_{14}COOH$), pelargonic acid ($CH_3(CH_2)_7COOH$) and lauric acid ($CH_3(CH_2)_{10}COOH$). Examples of suitable unsaturated fatty acids, i.e., a fatty acid in which there are one or more double bonds between the carbon atoms in the alkyl chain, include but are not limited to oleic acid ($CH_3(CH_2)_7CH:CH(CH_2)_7COOH$).

The source of the metal ions used to produce the metal salts of the fatty or waxy acid salts used in the various modified ionomers are generally various metal salts which provide the metal ions capable of neutralizing, to various extents, the carboxylic acid groups of the fatty acids. These include the sulfate, carbonate, acetate and hydroxylate salts of zinc, barium, calcium and magnesium.

Since the fatty acid salts modifiers comprise various combinations of fatty acids neutralized with a large number of different metal ions, several different types of fatty acid salts may be utilized in the invention, including metal stearates, laureates, oleates, and palmitates, with calcium, zinc, sodium, lithium, potassium and magnesium stearate being preferred, and calcium and sodium stearate being most preferred.

The fatty or waxy acid or metal salt of said fatty or waxy acid is present in the modified ionomeric polymers in an amount of from about 5 to about 40, preferably from about 7 to about 35, more preferably from about 8 to about 20 weight percent (based on the total weight of said modified ionomeric polymer).

As a result of the addition of the one or more metal salts of a fatty or waxy acid, from about 40 to 100, preferably from about 50 to 100, more preferably from about 70 to 100 percent of the acidic groups in the final modified ionomeric polymer composition are neutralized by a metal ion.

An example of such a modified ionomer polymer is DuPont® HPF-1000 available from E. I. DuPont de Nemours and Co. Inc.

Another preferred material to which the aramid polymer may be added and which also may be used as a separate component of the cover layer or intermediate layer of the golf balls of the present invention is a multi component blend composition ("MCBC") prepared by blending together at least three materials, identified as Components A, B, and C, and melt-processing these components to form in-situ, a polymer blend composition incorporating a pseudo-crosslinked polymer network.

The first of these blend components (blend Component A) include block copolymers including di and triblock copolymers, incorporating a first polymer block having an aromatic vinyl compound, and a second polymer block having an olefinic and/or conjugated diene compound. Preferred aromatic vinyl compounds include styrene, α-methylstyrene, o-, m- or p-methylstyrene, 4-propylstyrene, 1,3-dimethylstyrene, vinylnaphthalene and vinylanthracene. In particular, styrene and α-methylstyrene are preferred. These aromatic vinyl compounds can each be used alone, or can be used in combination of two or more kinds. The aromatic vinyl compound is preferably contained in the block copolymer (b) in an amount of from 5 to 75% by weight, and more preferably from 10 to 65% by weight.

The conjugated diene compound, that constitutes the polymer block B in the block copolymer (b), includes, e.g., 1,3-butadiene, isoprene, 2,3-dimethyl-1,3-butadiene, 1,3-pentadiene and 1,3-hexadiene. In particular, isoprene and 1,3-butadiene are preferred. These conjugated diene compounds can each be used alone, or can be used in combination of two or more kinds.

Preferred block copolymers include the styrenic block copolymers such as styrene-butadiene-styrene (SBS), styrene-ethylene-butylene-styrene, (SEBS) and styrene-ethylene-propylene-styrene (SERS). Commercial examples include SEPTON marketed by Kuraray Company of Kurashiki, Japan; TOPRENE by Kumho Petrochemical Co., Ltd and KRATON marketed by Kraton Polymers.

Also included are functionalized styrenic block copolymers, including those where the block copolymer incorporates a first polymer block having an aromatic vinyl compound, a second polymer block having a conjugated diene compound and a hydroxyl group located at a block copolymer, or its hydrogenation product. A preferred functionalized styrenic block copolymer is SEPTON HG-252.

The second blend component, Component B, is an acidic polymer that incorporates at least one type of an acidic functional group. Examples of such polymers suitable for use as include, but are not limited to, ethylene/(meth)acrylic acid copolymers and ethylene/(meth)acrylic acid/alkyl (meth) acrylate terpolymers, or ethylene and/or propylene maleic anhydride copolymers and terpolymers. Examples of such polymers which are commercially available include, but are not limited to, the Escor® 5000, 5001, 5020, 5050, 5070, 5100, 5110 and 5200 series of ethylene-acrylic acid copolymers sold by Exxon Mobil, the PRIMACOR® 1321, 1410, 1410-XT, 1420, 1430, 2912, 3150, 3330, 3340, 3440, 3460, 4311, 4608 and 5980 series of ethylene-acrylic acid copolymers sold by The Dow Chemical Company, Midland, Mich. and the ethylene-methacrylic acid copolymers such as Nucrel 599, 699, 0903, 0910, 925, 960, 2806, and 2906 commercially available from DuPont Also included are the so called bimodal ethylene/carboxylic acid polymers as described in U.S. Pat. No. 6,562,906, the contents of which are incorporated herein by reference. These polymers comprise a first component comprising an ethylene/α,β-ethylenically unsaturated $C_{3-8}$ carboxylic acid high copolymer, particularly ethylene (meth)acrylic acid copolymers and ethylene, alkyl (meth)acrylate, (meth)acrylic acid terpolymers, having a weight average molecular weight, Mw, of about 80,000 to about 500,000, and a second component comprising an ethylene/α,β-ethylenically unsaturated $C_{3-8}$ carboxylic acid copolymers, particularly ethylene/(meth) acrylic acid copolymers having weight average molecular weight, Mw, of about 2,000 to about 30,000.

Component C is a base capable of neutralizing the acidic functional group of Component B and typically is a base having a metal cation. These metals are from groups IA, IB, IIA, IIB, IIIA, IIIB, IVA, IVB, VA, VB, VIIA, VIIB, VIIB and VIIIB of the periodic table. Examples of these metals include lithium, sodium, magnesium, aluminum, potassium, calcium, manganese, tungsten, titanium, iron, cobalt, nickel, hafnium, copper, zinc, barium, zirconium, and tin. Suitable metal compounds for use as a source of Component C are, for example, metal salts, preferably metal hydroxides, metal oxides, metal carbonates, metal acetates, metal stearates, metal laureates, metal oleates, metal palmitates and the like.

The MCBC composition preferably is prepared by mixing the above materials into each other thoroughly, either by using a dispersive mixing mechanism, a distributive mixing mechanism, or a combination of these. These mixing methods are well known in the manufacture of polymer blends. As a result of this mixing, the acidic functional group of Component B is dispersed evenly throughout the mixture in either their neutralized or non-neutralized state. Most preferably, Components A and B are melt-mixed together without Component C, with or without the premixing discussed above, to produce a melt-mixture of the two components. Then, Component C separately is mixed into the blend of Components A and B. This mixture is melt-mixed to produce the reaction product. This two-step mixing can be performed in a single process, such as, for example, an extrusion process using a proper barrel length or screw configuration, along with a multiple feeding system.

The resulting MCBC compositions may be further modified by the addition of an impact modifier, which can include copolymers or terpolymers having a glycidyl group, hydroxyl group, maleic anhydride group or carboxylic group, collectively referred to as functionalized polymers. These copolymers and terpolymers may comprise an α-olefin. Examples of suitable α-olefins include ethylene, propylene, 1-butene, 1-pentene, 3-methyl-1-butene, 1-hexene, 4-methyl-1-petene, 3-methyl-1-pentene, 1-octene, 1-decene-, 1-dodecene, 1-tetradecene, 1-hexadecene, 1-octadecene, 1-eicocene, 1-docecene, 1-tetracocene, 1-hexacocene, 1-octacocene, and 1-triacontene. One or more of these α-olefins may be used.

Examples of suitable glycidyl groups in copolymers or terpolymers in the polymeric modifier include esters and ethers of aliphatic glycidyl, such as allylglycidylether, vinylglycidylether, glycidyl maleate and itaconatem glycidyl acrylate and methacrylate, and also alicyclic glycidyl esters and ethers, such as 2-cyclohexene-1-glycidylether, cyclohexene-4,5 diglyxidylcarboxylate, cyclohexene-4-glycidyl carobxylate, 5-norboenene-2-methyl-2-glycidyl carboxylate, and endocis-bicyclo(2,2,1)-5-heptene-2,3-diglycidyl dicarboxylate. These polymers having a glycidyl group may comprise other monomers, such as esters of unsaturated carboxylic acid, for example, alkyl(meth)acrylates or vinyl esters of unsaturated carboxylic acids. Polymers having a glycidyl group can be obtained by copolymerization or graft polymerization with homopolymers or copolymers.

Examples of suitable terpolymers having a glycidyl group include LOTADER AX8900 and AX8920, marketed by Atofina Chemicals, ELVALOY marketed by E.I. Du Pont de Nemours & Co., and REXPEARL marketed by Nippon Petrochemicals Co., Ltd. Additional examples of copolymers comprising epoxy monomers and which are suitable for use within the scope of the present invention include styrene-butadiene-styrene block copolymers in which the polybutadiene block contains epoxy group, and styrene-isoprene-styrene block copolymers in which the polyisoprene block contains epoxy. Commercially available examples of these epoxy functional copolymers include ESBS A1005, ESBS A1010, ESBS A1020, ESBS AT018, and ESBS AT019, marketed by Daicel Chemical Industries, Ltd.

Examples of polymers or terpolymers incorporating a maleic anhydride group suitable for use within the scope of the present invention include maleic anhydride-modified ethylene-propylene copolymers, maleic anhydride-modified ethylene-propylene-diene terpolymers, maleic anhydride-modified polyethylenes, maleic anhydride-modified polypropylenes, ethylene-ethylacrylate-maleic anhydride terpolymers, and maleic anhydride-indene-styrene-cumarone polymers. Examples of commercially available copolymers incorporating maleic anhydride include: BONDINE, marketed by Sumitomo Chemical Co., such as BONDINE AX8390, an ethylene-ethyl acrylate-maleic anhydride terpolymer having a combined ethylene acrylate and maleic anhydride content of 32% by weight, and BONDINE TX TX8030, an ethylene-ethyl acrylate-maleic anhydride terpolymer having a combined ethylene acrylate and maleic anhydride content of 15% by weight and a maleic anhydride content of 1% to 4% by weight; maleic anhydride-containing LOTADER 3200, 3210, 6200, 8200, 3300, 3400, 3410, 7500, 5500, 4720, and 4700, marketed by Atofina Chemicals; EXXELOR VA1803, a maleic anyhydride-modified ethylene-propylene copolymer having a maleic anyhydride content of 0.7% by weight, marketed by Exxon Chemical Co.; and KRATON FG 1901X, a maleic anhydride functionalized triblock copolymer having polystyrene endblocks and poly(ethylene/butylene) midblocks, marketed by Shell Chemical. Preferably the functional polymer component is a maleic anhydride grafted polymers preferably maleic anhydride grafted polyolefins (for example, Exxellor VA1803).

Another preferred material to which the aramid polymer may be added and which also may be used as a separate component of the cover layer or intermediate layer of the golf balls of the present invention are the polyalkenamers which may be prepared by ring opening metathesis polymerization of one or more cycloalkenes in the presence of organometallic catalysts as described in U.S. Pat. Nos. 3,492,245, and 3,804, 803, the entire contents of both of which are herein incorporated by reference. Examples of suitable polyalkenamer rubbers are polypentenamer rubber, polyheptenamer rubber, polyoctenamer rubber, polydecenamer rubber and polydodecenamer rubber. For further details concerning polyalkenamer rubber, see Rubber Chem. & Tech., Vol. 47, page 511-596, 1974, which is incorporated herein by reference.

The polyalkenamer rubbers used in the present invention have a trans-content of from about 40 to about 95, preferably of from about 45 to about 90, and most preferably from about 50 to about 85 wt %, and a cis-content of from about 5 to about 60, preferably of from about 10 to about 55, and most preferably from about 15 to about 50 wt % with a melting point of greater than about 15, preferably greater than about 20 more preferably greater than about 25° C. and exhibit excellent melt processability above their sharp melting temperatures and high miscibility with various rubber additives as a major component without deterioration of crystallinity which in turn facilitates injection molding. Thus, unlike synthetic rubbers typically used in golf ball preparation, polyalkenamer-based compounds can be prepared which are injection moldable. The polyalkenamer rubbers may also be blended with other polymers and an especially preferred blend is that of a polyalkenamer and a polyamide. A more complete description of the polyalkenamer rubbers and blends with polyamides is disclosed in c U.S. Pat. No. 7,528,196 in the name of Hyun Kim et al., the entire contents of which are hereby incorporated by reference. Polyoctenamer rubbers are commercially available from Huls AG of Marl, Germany, and through its distributor in the U.S., Creanova Inc. of Somerset, N.J., and sold under the trademark VESTENAMER®. Two grades of the VESTENAMER® trans-polyoctenamer are commercially available: VESTENAMER 8012 designates a material having a trans-content of approximately 80% (and a cis-content of 20%) with a melting point of approximately 54° C.; and VESTENAMER 6213 designates a material having a trans-content of approximately 60% (cis-content of 40%) with a melting point of approximately 30° C. Both of these polymers have a double bond at every eighth carbon atom in the ring.

Another preferred material to which the aramid polymer may be added and which also may be used as a separate component of the cover layer or intermediate layer of the golf balls of the present invention is a blend of a homopolyamide or copolyamide modified with a functional polymer modifier. Illustrative polyamides for use in the polyamide blend compositions include those obtained by: (1) polycondensation of (a) a dicarboxylic acid, such as oxalic acid, adipic acid, sebacic acid, terephthalic acid, isophthalic acid, or 1,4-cyclohexanedicarboxylic acid, with (b) a diamine, such as ethylenediamine, tetramethylenediamine, pentamethylenediamine, hexamethylenediamine, decamethylenediamine, 1,4-cyclohexyldiamine or m-xylylenediamine; (2) a ring-opening polymerization of cyclic lactam, such as ε-caprolactam or ω-laurolactam; (3) polycondensation of an aminocarboxylic acid, such as 6-aminocaproic acid, 9-aminononanoic acid, 11-aminoundecanoic acid or 12-aminododecanoic acid; (4) copolymerization of a cyclic lactam with a dicarboxylic acid and a diamine; or any combination of (1)-(4). In certain examples, the dicarboxylic acid may be an aromatic dicarboxylic acid or a cycloaliphatic dicarboxylic acid. In certain examples, the diamine may be an aromatic diamine or a cycloaliphatic diamine. Specific examples of suitable polyamides include polyamide 6; polyamide 11; polyamide 12; polyamide 4,6; polyamide 6,6; polyamide 6,9; polyamide 6,10; polyamide 6,12; polyamide MXD6; PA12, CX; PA12, IT; PPA; PA6, IT; and PA6/PPE.

The functional polymer modifier of the polyamide used in the ball covers or intermediate layers of the present invention can include copolymers or terpolymers having a glycidyl group, hydroxyl group, maleic anhydride group or carboxylic group, collectively referred to as functionalized polymers.

These copolymers and terpolymers may comprise an α-olefin. Examples of suitable α-olefins include ethylene, propylene, 1-butene, 1-pentene, 3-methyl-1-butene, 1-hexene, 4-methyl-1-petene, 3-methyl-1-pentene, 1-octene, 1-decene-, 1-dodecene, 1-tetradecene, 1-hexadecene, 1-octadecene, 1-eicocene, 1-docoene, 1-tetracocene, 1-hexacocene, 1-octacocene, and 1-triacontene. One or more of these α-olefins may be used.

Examples of suitable glycidyl groups in copolymers or terpolymers in the polymeric modifier include esters and ethers of aliphatic glycidyl, such as allylglycidylether, vinylglycidylether, glycidyl maleate and itaconatem glycidyl acrylate and methacrylate, and also alicyclic glycidyl esters and ethers, such as 2-cyclohexene-1-glycidylether, cyclohexene-4,5 diglyxidylcarboxylate, cyclohexene-4-glycidyl carobxylate, 5-norboenene-2-methyl-2-glycidyl carboxylate, and endocis-bicyclo(2,2,1)-5-heptene-2,3-diglycidyl dicarboxylate. These polymers having a glycidyl group may comprise other monomers, such as esters of unsaturated carboxylic acid, for example, alkyl(meth)acrylates or vinyl esters of unsaturated carboxylic acids. Polymers having a glycidyl group can be obtained by copolymerization or graft polymerization with homopolymers or copolymers.

Examples of suitable terpolymers having a glycidyl group include LOTADER AX8900 and AX8920, marketed by Atofina Chemicals, ELVALOY marketed by E.I. Du Pont de Nemours & Co., and REXPEARL marketed by Nippon Petrochemicals Co., Ltd. Additional examples of copolymers comprising epoxy monomers and which are suitable for use within the scope of the present invention include styrene-butadiene-styrene block copolymers in which the polybutadiene block contains epoxy group, and styrene-isoprene-styrene block copolymers in which the polyisoprene block contains epoxy. Commercially available examples of these epoxy functional copolymers include ESBS A1005, ESBS A1010, ESBS A1020, ESBS AT018, and ESBS AT019, marketed by Daicel Chemical Industries, Ltd.

Examples of polymers or terpolymers incorporating a maleic anhydride group suitable for use within the scope of the present invention include maleic anhydride-modified ethylene-propylene copolymers, maleic anhydride-modified ethylene-propylene-diene terpolymers, maleic anhydride-modified polyethylenes, maleic anhydride-modified polypropylenes, ethylene-ethylacrylate-maleic anhydride terpolymers, and maleic anhydride-indene-styrene-cumarone polymers. Examples of commercially available copolymers incorporating maleic anhydride include: BONDINE, marketed by Sumitomo Chemical Co., such as BONDINE AX8390, an ethylene-ethyl acrylate-maleic anhydride terpolymer having a combined ethylene acrylate and maleic anhydride content of 32% by weight, and BONDINE TX TX8030, an ethylene-ethyl acrylate-maleic anhydride terpolymer having a combined ethylene acrylate and maleic anhydride content of 15% by weight and a maleic anhydride content of 1% to 4% by weight; maleic anhydride-containing LOTADER 3200, 3210, 6200, 8200, 3300, 3400, 3410, 7500, 5500, 4720, and 4700, marketed by Atofina Chemicals; EXXELOR VA1803, a maleic anyhydride-modified ethylene-propylene copolymer having a maleic anyhydride content of 0.7% by weight, marketed by Exxon Chemical Co.; and KRATON FG 1901X, a maleic anhydride functionalized triblock copolymer having polystyrene endblocks and poly(ethylene/butylene) midblocks, marketed by Shell Chemical. Preferably the functional polymer component is a maleic anhydride grafted polymers preferably maleic anhydride grafted polyolefins (for example, Exxellor VA1803).

Another preferred material to which the aramid polymer may be added and which also may be used as a separate component of the cover layer or intermediate layer of the golf balls of the present invention is the family of polyurethanes or polyureas which are typically prepared by reacting a diisocyanate with a polyol (in the case of polyurethanes) or with a polyamine (in the case of a polyurea). Thermoplastic polyurethanes or polyureas may consist solely of this initial mixture or may be further combined with a chain extender to vary properties such as hardness of the thermoplastic. Thermoset polyurethanes or polyureas typically are formed by the reaction of a diisocyanate and a polyol or polyamine respectively, and an additional crosslinking agent to crosslink or cure the material to result in a thermoset.

In what is known as a one-shot process, the three reactants, diisocyanate, polyol or polyamine, and optionally a chain extender or a curing agent, are combined in one step. Alternatively, a two-step process may occur in which the first step involves reacting the diisocyanate and the polyol (in the case of polyurethane) or the polyamine (in the case of a polyurea) to form a so-called prepolymer, to which can then be added either the chain extender or the curing agent. This procedure is known as the prepolymer process.

In addition, although depicted as discrete component packages as above, it is also possible to control the degree of crosslinking, and hence the degree of thermoplastic or thermoset properties in a final composition, by varying the stoichiometry not only of the diisocyanate-to-chain extender or curing agent ratio, but also the initial diisocyanate-to-polyol or polyamine ratio. Of course in the prepolymer process, the initial diisocyanate-to-polyol or polyamine ratio is fixed on selection of the required prepolymer, although mixtures of prepolymers are also contemplated.

Any isocyanate available to one of ordinary skill in the art is suitable for use according to the invention. Isocyanates for use with the present invention include, but are not limited to, aliphatic, cycloaliphatic, aromatic aliphatic, aromatic, any derivatives thereof, and combinations of these compounds having two or more isocyanate (NCO) groups per molecule. As used herein, aromatic aliphatic compounds should be understood as those containing an aromatic ring, wherein the isocyanate group is not directly bonded to the ring. One example of an aromatic aliphatic compound is a tetramethylxylene diisocyanate (TMXDI). The isocyanates may be organic polyisocyanate-terminated prepolymers, low free isocyanate prepolymer, and mixtures thereof. The isocyanate-containing reactable component also may include any isocyanate-functional monomer, dimer, trimer, or polymeric adduct thereof, prepolymer, quasi-prepolymer, or mixtures thereof. Isocyanate-functional compounds may include monoisocyanates or polyisocyanates that include any isocyanate functionality of two or more.

Suitable isocyanate-containing components include diisocyanates having the generic structure: O=C=N—R—N=O, where R preferably is a cyclic, aromatic, or linear or branched hydrocarbon moiety containing from about 1 to about 50 carbon atoms. The isocyanate also may contain one or more cyclic groups or one or more phenyl groups. When multiple cyclic or aromatic groups are present, linear and/or branched hydrocarbons containing from about 1 to about 10 carbon atoms can be present as spacers between the cyclic or aromatic groups. In some cases, the cyclic or aromatic group(s) may be substituted at the 2-, 3-, and/or 4-positions, or at the ortho-, meta-, and/or para-positions, respectively. Substituted groups may include, but are not limited to, halogens, primary, secondary, or tertiary hydrocarbon groups, or a mixture thereof.

Examples of isocyanates that can be used with the present invention include, but are not limited to, substituted and isomeric mixtures including 2,2'-, 2,4'-, and 4,4'-diphenylmethane diisocyanate (MDI); 3,3'-dimethyl-4,4'-biphenylene diisocyanate (TODI); toluene diisocyanate (TDI); polymeric MDI; carbodiimide-modified liquid 4,4'-diphenylmethane diisocyanate; para-phenylene diisocyanate (PPDI); meta-phenylene diisocyanate (MPDI); triphenyl methane-4,4'- and triphenyl methane-4,4''-triisocyanate; naphthylene-1,5-diisocyanate; 2,4'-, 4,4'-, and 2,2-biphenyl diisocyanate; polyphenylene polymethylene polyisocyanate (PMDI) (also known as polymeric PMDI); mixtures of MDI and PMDI; mixtures of PMDI and TDI; ethylene diisocyanate; propylene-1,2-diisocyanate; trimethylene diisocyanate; butylenes diisocyanate; bitolylene diisocyanate; tolidine diisocyanate; tetramethylene-1,2-diisocyanate; tetramethylene-1,3-diisocyanate; tetramethylene-1,4-diisocyanate; pentamethylene diisocyanate; 1,6-hexamethylene diisocyanate (HDI); octamethylene diisocyanate; decamethylene diisocyanate; 2,2,4-trimethylhexamethylene diisocyanate; 2,4,4-trimethylhexamethylene diisocyanate; dodecane-1,12-diisocyanate; dicyclohexylmethane diisocyanate; cyclobutane-1,3-diisocyanate; cyclohexane-1,2-diisocyanate; cyclohexane-1,3-diisocyanate; cyclohexane-1,4-diisocyanate; diethylidene diisocyanate; methylcyclohexylene diisocyanate (HTDI); 2,4-methylcyclohexane diisocyanate; 2,6-methylcyclohexane diisocyanate; 4,4'-dicyclohexyl diisocyanate; 2,4'-dicyclohexyl diisocyanate; 1,3,5-cyclohexane triisocyanate; isocyanatomethylcyclohexane isocyanate; 1-isocyanato-3,3,5-trimethyl-5-isocyanatomethylcyclohexane; isocyanatoethylcyclohexane isocyanate; bis(isocyanatomethyl)-cyclohexane diisocyanate; 4,4'-bis(isocyanatomethyl) dicyclohexane; 2,4'-bis(isocyanatomethyl)dicyclohexane; isophorone diisocyanate (IPDI); dimeryl diisocyanate, dodecane-1,12-diisocyanate, 1,10-decamethylene diisocyanate, cyclohexylene-1,2-diisocyanate, 1,10-decamethylene diisocyanate, 1-chlorobenzene-2,4-diisocyanate, furfurylidene diisocyanate, 2,4,4-trimethyl hexamethylene diisocyanate, 2,2,4-trimethyl hexamethylene diisocyanate, dodecamethylene diisocyanate, 1,3-cyclopentane diisocyanate, 1,3-cyclohexane diisocyanate, 1,3-cyclobutane diisocyanate, 1,4-cyclohexane diisocyanate, 4,4'-methylenebis(cyclohexyl isocyanate), 4,4'-methylenebis-(phenyl isocyanate), 1-methyl-2,4-cyclohexane diisocyanate, 1-methyl-2,6-cyclohexane diisocyanate, 1,3-bis(isocyanato-methyl)cyclohexane, 1,6-diisocyanato-2,2,4,4-, tetramethyl-hexane, 1,6-diisocyanato-2,4,4-tetra-trimethylhexane, trans-cyclohexane-1,4-diisocyanate, 3-isocyanato-methyl-3,5,5-trimethylcyclohexyl isocyanate, 1-isocyanato-3,3,5-trimethyl-5-isocyanatomethylcyclohexane, cyclohexyl isocyanate, dicyclohexylmethane 4,4'-diisocyanate, 1,4-bis(isocyanatomethyl)cyclohexane, m-phenylene diisocyanate, m-xylylene diisocyanate, m-tetramethylxylylene diisocyanate, p-phenylene diisocyanate, p,p'-biphenyl diisocyanate, 3,3'-dimethyl-4,4'-biphenylene diisocyanate, 3,3'-dimethoxy-4,4'-biphenylene diisocyanate, 3,3'-diphenyl-4,4'-biphenylene diisocyanate, 4,4'-biphenylene diisocyanate, 3,3'-dichloro-4,4'-biphenylene diisocyanate, 1,5-naphthalene diisocyanate, 4-chloro-1,3-phenylene diisocyanate, 1,5-tetrahydronaphthalene diisocyanate, metaxylene diisocyanate, 2,4-toluene diisocyanate, 2,4'-diphenylmethane diisocyanate, 2,4-chlorophenylene diisocyanate, 4,4'-diphenylmethane diisocyanate, p,p'-diphenylmethane diisocyanate, 2,4-tolylene diisocyanate, 2,6-tolylene diisocyanate, 2,2-diphenylpropane-4,4'-diisocyanate, 4,4'-toluidine diisocyanate, dianidine diisocyanate, 4,4'-diphenyl ether diisocyanate, 1,3-xylylene diisocyanate, 1,4-naphthylene diisocyanate, azobenzene-4,4'-diisocyanate, diphenyl sulfone-4,4'-diisocyanate, triphenylmethane 4,4',4''-triisocyanate, isocyanatoethyl methacrylate, 3-isopropenyl-α,α-dimethylbenzyl-isocyanate, dichlorohexamethylene diisocyanate, ω,ω'-diisocyanato-1,4-diethylbenzene, polymethylene polyphenylene polyisocyanate, isocyanurate modified compounds, and carbodiimide modified compounds, as well as biuret modified compounds of the above polyisocyanates.

These isocyanates may be used either alone or in combination. These combination isocyanates include triisocyanates, such as biuret of hexamethylene diisocyanate and triphenylmethane triisocyanates, and polyisocyanates, such as polymeric diphenylmethane diisocyanate.triisocyanate of HDI; triisocyanate of 2,2,4-trimethyl-1,6-hexane diisocyanate (TMDI); 4,4'-dicyclohexylmethane diisocyanate ($H_{12}$MDI); 2,4-hexahydrotoluene diisocyanate; 2,6-hexahydrotoluene diisocyanate; 1,2-, 1,3-, and 1,4-phenylene diisocyanate; aromatic aliphatic isocyanate, such as 1,2-, 1,3-, and 1,4-xylene diisocyanate; meta-tetramethylxylene diisocyanate (m-TMXDI); para-tetramethylxylene diisocyanate (p-TMXDI); trimerized isocyanurate of any polyisocyanate, such as isocyanurate of toluene diisocyanate, trimer of diphenylmethane diisocyanate, trimer of tetramethylxylene diisocyanate, isocyanurate of hexamethylene diisocyanate, and mixtures thereof, dimerized uretdione of any polyisocyanate, such as uretdione of toluene diisocyanate, uretdione of hexamethylene diisocyanate, and mixtures thereof; modified polyisocyanate derived from the above isocyanates and polyisocyanates; and mixtures thereof.

Any polyol now known or hereafter developed is suitable for use according to the invention. Polyols suitable for use in the present invention include, but are not limited to, polyester polyols, polyether polyols, polycarbonate polyols and polydiene polyols such as polybutadiene polyols. Suitable polyether polyols include polytetramethylene ether glycol; poly(oxypropylene) glycol; and polybutadiene glycol. Suitable polyester polyols include polyethylene adipate glycol; polyethylene propylene adipate glycol; and polybutylene adipate glycol. Suitable polylactone polyols include diethylene glycol initiated caprolactone; 1,4-butanediol initiated caprolactone; trimethylol propane initiated caprolactone; and neopentyl glycol initiated caprolactone. The preferred polyols are polytetramethylene ether glycol; polyethylene adipate glycol; polybutylene adipate glycol; and diethylene glycol initiated caprolactone. The most preferred polyol is polytetramethylene ether glycol (PTMEG). Like urethane elastomers made with other ether polyols, urethane elastomers made with PTMEG exhibit good hydrolytic stability and good tensile strength. Hydrolytic stability allows for a golf ball product that is substantially impervious to the effects of moisture. Thus, a golf ball made with a polyurethane system that has an ether glycol for the polyol component will have a longer shelf life, i.e., retains physical properties under prolonged humid conditions.

Any polyamine available to one of ordinary skill in the polyurethane art is suitable for use according to the invention. Polyamines suitable for use in the compositions of the present invention include, but are not limited to amine-terminated compounds typically are selected from amine-terminated hydrocarbons, amine-terminated polyethers, amine-terminated polyesters, amine-terminated polycaprolactones, amine-terminated polycarbonates, amine-terminated polyamides, and mixtures thereof. The amine-terminated compound may be a polyether amine selected from polytetramethylene ether diamines, polyoxypropylene diamines, poly(ethylene oxide capped oxypropylene) ether diamines, triethyleneglycoldiamines, propylene oxide-based triamines, trimethylolpropane-based triamines, glycerin-based triamines, and mixtures thereof.

The diisocyanate and polyol or polyamine components may be combined to form a prepolymer prior to reaction with a chain extender or curing agent. Any such prepolymer combination is suitable for use in the present invention.

One preferred prepolymer is a toluene diisocyanate prepolymer with polypropylene glycol. Such polypropylene glycol terminated toluene diisocyanate prepolymers are available from Uniroyal Chemical Company of Middlebury, Conn., under the trade name ADIPRENE® LFG963A and LFG640D. Most preferred prepolymers are the polytetramethylene ether glycol terminated toluene diisocyanate prepolymers including those available from Uniroyal Chemical Company of Middlebury, Conn., under the trade name ADIPRENE® LF930A, LF950A, LF601D, and LF751D.

In one embodiment, the number of free NCO groups in the urethane or urea prepolymer may be less than about 14 percent. Preferably the urethane or urea prepolymer has from about 3 percent to about 11 percent, more preferably from about 4 to about 9.5 percent, and even more preferably from about 3 percent to about 9 percent, free NCO on an equivalent weight basis.

Polyol chain extenders or curing agents may be primary, secondary, or tertiary polyols. Non-limiting examples of monomers of these polyols include: trimethylolpropane (TMP), ethylene glycol, 1,3-propanediol, 1,4-butanediol, 1,5-pentanediol, 1,6-hexanediol, propylene glycol, dipropylene glycol, 1,2-butanediol, 1,3-butanediol, 2,3-butanediol, 1,2-pentanediol, 2,3-pentanediol, 2,5-hexanediol, 2,4-hexanediol, 2-ethyl-1,3-hexanediol, cyclohexanediol, and 2-ethyl-2-(hydroxymethyl)-1,3-propanediol.

Diamines and other suitable polyamines may be added to the compositions of the present invention to function as chain extenders or curing agents. These include primary, secondary and tertiary amines having two or more amines as functional groups. Exemplary diamines include aliphatic diamines, such as tetramethylenediamine, pentamethylenediamine, hexamethylenediamine; alicyclic diamines, such as 3,3'-dimethyl-4,4'-diamino-dicyclohexyl methane; or aromatic diamines, such as diethyl-2,4-toluenediamine, 4,4''-methylenebis-(3-chloro,2,6-diethyl)-aniline (available from Air Products and Chemicals Inc., of Allentown, Pa., under the trade name LONZACURE®), 3,3'-dichlorobenzidene; 3,3'-dichloro-4,4'-diaminodiphenyl methane (MOCA); N,N,N',N'-tetrakis(2-hydroxypropyl)ethylenediamine, 3,5-dimethylthio-2,4-toluenediamine; 3,5-dimethylthio-2,6-toluenediamine; N,N'-dialkyldiamino diphenyl methane; trimethylene-glycol-di-p-aminobenzoate; polytetramethyleneoxide-di-p-aminobenzoate, 4,4'-methylene bis-2-chloroaniline, 2,2',3,3'-tetrachloro-4,4'-diamino-phenyl methane, p,p'-methylenedianiline, p-phenylenediamine or 4,4'-diaminodiphenyl; and 2,4,6-tris(dimethylaminomethyl) phenol.

Depending on their chemical structure, curing agents may be slow- or fast-reacting polyamines or polyols. As described in U.S. Pat. Nos. 6,793,864, 6,719,646 and U.S. Patent Publication No. 2004/0201133 A1, (the contents of all of which are hereby incorporated herein by reference), slow-reacting polyamines are diamines having amine groups that are sterically and/or electronically hindered by electron withdrawing groups or bulky groups situated proximate to the amine reaction sites. The spacing of the amine reaction sites will also affect the reactivity speed of the polyamines.

Suitable curatives for use in the present invention are selected from the slow-reacting polyamine group include, but are not limited to, 3,5-dimethylthio-2,4-toluenediamine; 3,5-dimethylthio-2,6-toluenediamine; N,N'-dialkyldiamino diphenyl methane; trimethylene-glycol-di-p-aminobenzoate; polytetramethyleneoxide-di-p-aminobenzoate, and mixtures thereof. Of these, 3,5-dimethylthio-2,4-toluenediamine and 3,5-dimethylthio-2,6-toluenediamine are isomers and are sold under the trade name ETHACURE® 300 by Ethyl Corporation. Trimethylene glycol-di-p-aminobenzoate is sold under the trade name POLACURE 740M and polytetramethyleneoxide-di-p-aminobenzoates are sold under the trade name POLAMINES by Polaroid Corporation. N,N'-dialkyldiamino diphenyl methane is sold under the trade name UNILINK® by UOP.

Also included as a curing agent for use in the polyurethane or polyurea compositions used in the present invention are the family of dicyandiamides as described in U.S. Pat. No. 7,879,968 filed by Kim et al., the entire contents of which are hereby incorporated by reference.

In addition to discrete thermoplastic or thermoset materials, it also is possible to modify thermoplastic polyurethane or polyurea composition by introducing materials in the composition that undergo subsequent curing after molding the thermoplastic to provide properties similar to those of a thermoset. For example, Kim in U.S. Pat. No. 6,924,337, the entire contents of which are hereby incorporated by reference, discloses a thermoplastic urethane or urea composition optionally comprising chain extenders and further comprising a peroxide or peroxide mixture, which can then undergo post curing to result in a thermoset.

Also, Kim et al. in U.S. Pat. No. 6,939,924, the entire contents of which are hereby incorporated by reference, discloses a thermoplastic urethane or urea composition, optionally also comprising chain extenders, that are prepared from a diisocyanate and a modified or blocked diisocyanate which unblocks and induces further cross linking post extrusion. The modified isocyanate preferably is selected from the group consisting of: isophorone diisocyanate (IPDI)-based uretdione-type crosslinker; a combination of a uretdione adduct of IPDI and a partially ∈-caprolactam-modified IPDI; a combination of isocyanate adducts modified by ∈-caprolactam and a carboxylic acid functional group; a caprolactam-modified Desmodur diisocyanate; a Desmodur diisocyanate having a 3,5-dimethylpyrazole modified isocyanate; or mixtures of these.

Finally, Kim et al. in U.S. Pat. No. 7,037,985 B2, the entire contents of which are hereby incorporated by reference, discloses thermoplastic urethane or urea compositions further comprising a reaction product of a nitroso compound and a diisocyanate or a polyisocyanate. The nitroso reaction product has a characteristic temperature at which it decomposes to regenerate the nitroso compound and diisocyanate or polyisocyanate. Thus, by judicious choice of the post-processing temperature, further crosslinking can be induced in the originally thermoplastic composition to provide thermoset-like properties.

Other materials to which the aramid polymer may be added and which also may be used as a separate component of the core, cover layer or intermediate layer of the golf balls of the present invention include, without limitation, synthetic and natural rubbers, thermoset polymers such as thermoset polyurethanes or thermoset polyureas, as well as thermoplastic polymers including thermoplastic elastomers such as metallocene catalyzed polymer, unimodal ethylene/carboxylic acid copolymers, unimodal ethylene/carboxylic acid/carboxylate terpolymers, bimodal ethylene/carboxylic acid copolymers, bimodal ethylene/carboxylic acid/carboxylate terpolymers, thermoplastic polyurethanes, thermoplastic polyureas, polyamides, copolyamides, polyesters, copolyesters, polycarbonates, polyolefins, halogenated (e.g. chlorinated) polyolefins, halogenated polyalkylene compounds, such as halogenated polyethylene [e.g. chlorinated polyethylene (CPE)], polyalkenamer, polyphenylene oxides, polyphenylene sulfides, diallyl phthalate polymers, polyimides, polyvinyl chlorides, polyamide-ionomers, polyurethane-ionomers, polyvinyl alcohols, polyarylates, polyacrylates, polyphenylene ethers, impact-modified polyphenylene ethers, polystyrenes, high impact polystyrenes, acrylonitrile-butadiene-styrene copolymers, styrene-acrylonitriles (SAN), acrylonitrile-styrene-acrylonitriles, styrene-maleic anhydride (S/MA) polymers, styrenic block copolymers including styrene-butadiene-styrene (SBS), styrene-ethylene-butylene-styrene, (SEBS) and styrene-ethylene-propylene-styrene (SEPS), styrenic terpolymers, functionalized styrenic block copolymers including hydroxylated, functionalized styrenic copolymers, and terpolymers, cellulosic polymers, liquid crystal polymers (LCP), ethylene-propylene-diene terpolymers (EPDM), ethylene-vinyl acetate copolymers (EVA), ethylene-propylene copolymers, propylene elastomers (such as those described in U.S. Pat. No. 6,525,157, to Kim et al, the entire contents of which is hereby incorporated by reference in its entirety), ethylene vinyl acetates, polyureas, and polysiloxanes and any and all combinations thereof.

The various polymer compositions used to prepare the golf balls of the present invention may also be further modified by addition of a monomeric aliphatic and/or aromatic amide as described in copending US Publication No. 2007-0100085 A1 filed on Nov. 1, 2006 in the name of Hyun Kim et al., the entire contents of which are hereby incorporated by reference.

Another particularly well-suited additive for use in the various polymer compositions used to prepare the golf balls of the present invention includes compounds having the general formula:

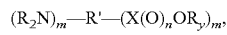

$(R_2N)_m—R'—(X(O)_nOR_y)_m$, where R is hydrogen, or a $C_1$-$C_{20}$ aliphatic, cycloaliphatic or aromatic systems; R' is a bridging group comprising one or more $C_1$-$C_{20}$ straight chain or branched aliphatic or alicyclic groups, or substituted straight chain or branched aliphatic or alicyclic groups, or aromatic group, or an oligomer of up to 12 repeating units including, but not limited to, polypeptides derived from an amino acid sequence of up to 12 amino acids; and X is C or S with the proviso that when X=C, n=1 and y=1 and when X=S, n=2 and y=1. Also, m=1-3. These materials are more fully described in U.S. Pat. No. 7,767,759 filed on Jul. 14, 2005, the entire contents of which are incorporated herein by reference.

Preferably the material is selected from the group consisting of 4,4'-methylene-bis-(cyclohexylamine)carbamate (commercially available from R.T. Vanderbilt Co., Norwalk Conn. under the tradename Diak® 4), 11-aminoundecanoicacid, 12-aminododecanoic acid, epsilon-caprolactam; omega-caprolactam, and any and all combinations thereof.

Golf balls within the scope of the present invention also can include, in suitable amounts, one or more additional ingredients generally employed in golf ball compositions. Agents provided to achieve specific functions, such as additives and stabilizers, can be present. Exemplary suitable ingredients include antioxidants, colorants, dispersants, mold releasing agents, processing aids, plasticizers, pigments, U.V. absorbers, optical brighteners, or any other additives generally employed in plastics formulation or the preparation of golf balls and any and all combinations thereof. Although not required, UV stabilizers, or photo stabilizers such as substituted hydroxphenyl benzotriazoles may be utilized in the present invention to enhance the UV stability of the final compositions. An example of a commercially available UV stabilizer is the stabilizer sold by Ciba Geigy Corporation under the tradename TINUVIN.

The various polymeric compositions used to prepare the golf balls of the present invention also can incorporate one or more fillers. Such fillers are typically in a finely divided form, for example, in a size generally less than about 20 mesh, preferably less than about 100 mesh U.S. standard size, except for fibers and flock, which are generally elongated. Filler particle size will depend upon desired effect, cost, ease of addition, and dusting considerations. The appropriate amounts of filler required will vary depending on the application but typically can be readily determined without undue experimentation.

The filler preferably is selected from the group consisting of precipitated hydrated silica, limestone, clay, talc, asbestos, barytes, glass fibers, aramid fibers, mica, calcium metasilicate, barium sulfate, zinc sulfide, lithopone, silicates, silicon carbide, diatomaceous earth, carbonates such as calcium or magnesium or barium carbonate, sulfates such as calcium or magnesium or barium sulfate, metals, including tungsten, steel, copper, cobalt or iron, metal alloys, tungsten carbide, metal oxides, metal stearates, and other particulate carbonaceous materials, and any and all combinations thereof. Preferred examples of fillers include metal oxides, such as zinc oxide and magnesium oxide. In another preferred aspect the filler comprises a continuous or non-continuous fiber. In another preferred aspect the filler comprises one or more so called nanofillers, as described in U.S. Pat. No. 6,794,447 and copending U.S. Publication No. US2004-0092336 filed on Sep. 24, 2003 and U.S. Pat. No. 7,332,533 filed on Aug. 25, 2004, the entire contents of each of which are incorporated herein by reference.

Inorganic nanofiller material generally is made of clay, such as hydrotalcite, phyllosilicate, saponite, hectorite, beidellite, stevensite, vermiculite, halloysite, mica, montmorillonite, micafluoride, or octosilicate. To facilitate incorporation of the nanofiller material into a polymer material, either in preparing nanocomposite materials or in preparing polymer-based golf ball compositions, the clay particles generally are coated or treated by a suitable compatibilizing agent. The compatibilizing agent allows for superior linkage between the inorganic and organic material, and it also can account for the hydrophilic nature of the inorganic nanofiller material and the possibly hydrophobic nature of the polymer. Compatibilizing agents may exhibit a variety of different structures depending upon the nature of both the inorganic nanofiller material and the target matrix polymer. Non-limiting examples include hydroxy-, thiol-, amino-, epoxy-, carboxylic acid-, ester-, amide-, and siloxy-group containing compounds, oligomers or polymers. The nanofiller materials can be incorporated into the polymer either by dispersion into the particular monomer or oligomer prior to polymerization, or by melt compounding of the particles into the matrix polymer. Examples of commercial nanofillers are various Cloisite grades including 10A, 15A, 20A, 25A, 30B, and NA+ of Southern Clay Products (Gonzales, Tex.) and the Nanomer grades including 1.24TL and C.30EVA of Nanocor, Inc. (Arlington Heights, Ill.).

Nanofillers when added into a matrix polymer can be mixed in three ways. In one type of mixing there is dispersion of the aggregate structures within the matrix polymer, but on mixing no interaction of the matrix polymer with the aggregate platelet structure occurs, and thus the stacked platelet structure is essentially maintained. As used herein, this type of mixing is defined as "undispersed".

However, if the nanofiller material is selected correctly, the matrix polymer chains can penetrate into the aggregates and separate the platelets, and thus when viewed by transmission electron microscopy or x-ray diffraction, the aggregates of platelets are expanded. At this point the nanofiller is said to be substantially evenly dispersed within and reacted into the structure of the matrix polymer. This level of expansion can occur to differing degrees. If small amounts of the matrix polymer are layered between the individual platelets then, as used herein, this type of mixing is known as "intercalation".

In some circumstances, further penetration of the matrix polymer chains into the aggregate structure separates the platelets, and leads to a complete disruption of the platelet's stacked structure in the aggregate. Thus, when viewed by transmission electron microscopy (TEM), the individual platelets are thoroughly mixed throughout the matrix polymer. As used herein, this type of mixing is known as "exfoliated". An exfoliated nanofiller has the platelets fully dispersed throughout the polymer matrix; the platelets may be dispersed unevenly but preferably are dispersed evenly.

While not wishing to be limited to any theory, one possible explanation of the differing degrees of dispersion of such nanofillers within the matrix polymer structure is the effect of the compatibilizer surface coating on the interaction between the nanofiller platelet structure and the matrix polymer. By careful selection of the nanofiller it is possible to vary the penetration of the matrix polymer into the platelet structure of the nanofiller on mixing. Thus, the degree of interaction and intrusion of the polymer matrix into the nanofiller controls the separation and dispersion of the individual platelets of the nanofiller within the polymer matrix. This interaction of the polymer matrix and the platelet structure of the nanofiller is defined herein as the nanofiller "reacting into the structure of the polymer" and the subsequent dispersion of the platelets within the polymer matrix is defined herein as the nanofiller "being substantially evenly dispersed" within the structure of the polymer matrix.

If no compatibilizer is present on the surface of a filler such as a clay, or if the coating of the clay is attempted after its addition to the polymer matrix, then the penetration of the matrix polymer into the nanofiller is much less efficient, very little separation and no dispersion of the individual clay platelets occurs within the matrix polymer.

Physical properties of the polymer will change with the addition of nanofiller. The physical properties of the polymer are expected to improve even more as the nanofiller is dispersed into the polymer matrix to form a nanocomposite.

Materials incorporating nanofiller materials can provide these property improvements at much lower densities than those incorporating conventional fillers. For example, a nylon-6 nanocomposite material manufactured by RTP Corporation of Wichita, Kans., uses a 3% to 5% clay loading and has a tensile strength of 11,800 psi and a specific gravity of 1.14, while a conventional 30% mineral-filled material has a tensile strength of 8,000 psi and a specific gravity of 1.36. Using nanocomposite materials with lower inorganic materials loadings than conventional fillers provides the same properties, and this allows products comprising nanocomposite fillers to be lighter than those with conventional fillers, while maintaining those same properties.

Nanocomposite materials are materials incorporating up to about 20%, or from about 0.1% to about 20%, preferably from about 0.1% to about 15%, and most preferably from about 0.1% to about 10% of nanofiller reacted into and substantially dispersed through intercalation or exfoliation into the structure of an organic material, such as a polymer, to provide strength, temperature resistance, and other property improvements to the resulting composite. Descriptions of particular nanocomposite materials and their manufacture can be found in U.S. Pat. No. 5,962,553 to Ellsworth, U.S. Pat. No. 5,385,776 to Maxfield et al., and U.S. Pat. No. 4,894,411 to Okada et al. Examples of nanocomposite materials currently marketed include M1030D, manufactured by Unitika Limited, of Osaka, Japan, and 1015C2, manufactured by UBE America of New York, N.Y.

When nanocomposites are blended with other polymer systems, the nanocomposite may be considered a type of nanofiller concentrate. However, a nanofiller concentrate may be more generally a polymer into which nanofiller is mixed; a nanofiller concentrate does not require that the nanofiller has reacted and/or dispersed evenly into the carrier polymer.

The nanofiller material is added in an amount up to about 20 wt %, from about 0.1% to about 20%, preferably from about 0.1% to about 15%, and most preferably from about 0.1% to about 10% by weight (based on the final weight of the polymer matrix material) of nanofiller reacted into and substantially dispersed through intercalation or exfoliation into the structure of the polymer matrix.

In an especially preferred aspect, a nanofiller additive component in the golf ball of the present invention is surface modified with a compatibilizing agent comprising the earlier described compounds having the general formula:

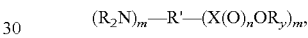

$(R_2N)_m$—$R'$—$(X(O)_nOR_y)_m$,

Preferably the material is selected from the group consisting of 4,4'-methylene-bis-(cyclohexylamine)carbamate (commercially available from R.T. Vanderbilt Co., Norwalk Conn. under the tradename Diak® 4), 11-aminoundecanoicacid, 12-aminododecanoic acid, epsilon-caprolactam; omega-caprolactam, and any and all combinations thereof.

A most preferred aspect would be a filler comprising a nanofiller clay material surface modified with an amino acid including 12-aminododecanoic acid. Such fillers are available from Nanonocor Co. under the tradename Nanomer 1.24TL.

The filler can be blended in variable effective amounts, such as amounts of greater than 0 to at least about 80 parts, and more typically from about 10 parts to about 80 parts, by weight per 100 parts by weight of the base rubber. If desired, the rubber composition can additionally contain effective amounts of a plasticizer, an antioxidant, and any other additives generally used to make golf balls.

Golf balls within the scope of the present invention also can include, in suitable amounts, one or more additional ingredients generally employed in golf ball compositions. Agents provided to achieve specific functions, such as additives and stabilizers, can be present. Examplary suitable ingredients include colorants, antioxidants, colorants, dispersants, mold releasing agents, processing aids, fillers, and any and all combinations thereof. Although not required, UV stabilizers, or photo stabilizers such as substituted hydroxphenyl benzotriazoles may be utilized in the present invention to enhance the UV stability of the final compositions. An example of a commercially available UV stabilizer is the stabilizer sold by Ciba Geigy Corporation under the tradename TINUVIN.

The cores of the golf balls of the present invention may include the traditional rubber components used in golf ball applications including, both natural and synthetic rubbers, such as cis-1,4-polybutadiene, trans-1,4-polybutadiene, 1,2-polybutadiene, cis-polyisoprene, trans-polyisoprene, polychloroprene, polybutylene, styrene-butadiene rubber, styrene-butadiene-styrene block copolymer and partially and fully hydrogenated equivalents, styrene-isoprene-styrene block copolymer and partially and fully hydrogenated equivalents, nitrile rubber, silicone rubber, and polyurethane, as well as mixtures of these. Polybutadiene rubbers, especially 1,4-polybutadiene rubbers containing at least 40 mol %, and more preferably 80 to 100 mol % of cis-1,4 bonds, are preferred because of their high rebound resilience, moldability, and high strength after vulcanization. The polybutadiene component may be synthesized by using rare earth-based catalysts, nickel-based catalysts, or cobalt-based catalysts, conventionally used in this field. Polybutadiene obtained by using lanthanum rare earth-based catalysts usually employ a combination of a lanthanum rare earth (atomic number of 57 to 71)-compound, but particularly preferred is a neodymium compound.

The 1,4-polybutadiene rubbers have a molecular weight distribution (Mw/Mn) of from about 1.2 to about 4.0, preferably from about 1.7 to about 3.7, even more preferably from about 2.0 to about 3.5, most preferably from about 2.2 to about 3.2. The polybutadiene rubbers have a Mooney viscosity ($ML_{1+4}$ (100° C.)) of from about 20 to about 80, preferably from about 30 to about 70, even more preferably from about 30 to about 60, most preferably from about 35 to about 50. The term "Mooney viscosity" used herein refers in each case to an industrial index of viscosity as measured with a Mooney viscometer, which is a type of rotary plastometer (see JIS K6300). This value is represented by the symbol $ML_{1+4}$ (100° C.), wherein "M" stands for Mooney viscosity, "L" stands for large rotor (L-type), "1+4" stands for a pre-heating time of 1 minute and a rotor rotation time of 4 minutes, and "100° C." indicates that measurement was carried out at a temperature of 100° C. As readily appreciated by one skilled in the art, blends of polybutadiene rubbers may also be utilized in the golf balls of the present invention, such blends may be prepared with any mixture of rare earth-based catalysts, nickel-based catalysts, or cobalt-based catalysts derived materials, and from materials having different molecular weights, molecular weight distributions and Mooney viscosity.

The cores of the golf balls of the present invention may also include 1,2-polybutadienes having differing tacticity, all of which are suitable as unsaturated polymers for use in the presently disclosed compositions, are atactic 1,2-polybutadiene, isotactic 1,2-polybutadiene, and syndiotactic 1,2-polybutadiene. Syndiotactic 1,2-polybutadiene having crystallinity suitable for use as an unsaturated polymer in the presently disclosed compositions are polymerized from a 1,2-addition of butadiene. The presently disclosed golf balls may include syndiotactic 1,2-polybutadiene having crystallinity and greater than about 70% of 1,2-bonds, more preferably greater than about 80% of 1,2-bonds, and most preferably greater than about 90% of 1,2-bonds. Also, the 1,2-polybutadiene may have a mean molecular weight between about 10,000 and about 350,000, more preferably between about 50,000 and about 300,000, more preferably between about 80,000 and about 200,000, and most preferably between about 10,000 and about 150,000. Examples of suitable syndiotactic 1,2-polybutadienes having crystallinity suitable for use in golf balls are sold under the trade names RB810, RB820, and RB830 by JSR Corporation of Tokyo, Japan.

The cores of the golf balls of the present invention may also include the polyalkenamer rubbers as previously described herein and disclosed in U.S. Pat. No. 7,528,196 in the name of Hyun Kim et al., the entire contents of which are hereby incorporated by reference.

The cores of the golf balls of the present invention may also include the various fillers as previously described herein. Especially preferred fillers include the one or more so called nanofillers, as described in U.S. Pat. No. 6,794,447 and copending U.S. Publication No. US2004-0092336 filed on Sep. 24, 2003 and U.S. Pat. No. 7,332,533 filed on Aug. 25, 2004, the entire contents of each of which are incorporated herein by reference.

When synthetic rubbers such as the aforementioned polybutadienes or polyalkenamers and their blends are used in the golf balls of the present invention they may contain further materials typically often used in rubber formulations including crosslinking agents, co-crosslinking agents, peptizers and accelerators.

Suitable cross-linking agents for use in the golf balls of the present invention include peroxides, sulfur compounds, or other known chemical cross-linking agents, as well as mixtures of these. Non-limiting examples of suitable cross-linking agents include primary, secondary, or tertiary aliphatic or aromatic organic peroxides. Peroxides containing more than one peroxy group can be used, such as 2,5-dimethyl-2,5-di(tert-butylperoxy)hexane and 1,4-di-(2-tert-butyl peroxyisopropyl)benzene. Both symmetrical and asymmetrical peroxides can be used, for example, tert-butyl perbenzoate and tert-butyl cumyl peroxide. Peroxides incorporating carboxyl groups also are suitable. The decomposition of peroxides used as cross-linking agents in the present invention can be brought about by applying thermal energy, shear, irradiation, reaction with other chemicals, or any combination of these. Both homolytically and heterolytically decomposed peroxide can be used in the present invention. Non-limiting examples of suitable peroxides include: diacetyl peroxide; di-tert-butyl peroxide; dibenzoyl peroxide; dicumyl peroxide; 2,5-dimethyl-2,5-di(benzoylperoxy)hexane; 1,4-bis-(t-butylperoxyisopropyl)benzene; t-butylperoxybenzoate; 2,5-dimethyl-2, 5-di-(t-butylperoxy)hexyne-3, such as Trigonox 145-45B, marketed by Akrochem Corp. of Akron, Ohio; 1,1-bis(t-butylperoxy)-3,3,5 tri-methylcyclohexane, such as Varox 231-XL, marketed by R.T. Vanderbilt Co., Inc. of Norwalk, Conn.; and di-(2,4-dichlorobenzoyl)peroxide. The cross-linking agents can be blended in total amounts of about 0.05 part to about 5 parts, more preferably about 0.2 part to about 3 parts, and most preferably about 0.2 part to about 2 parts, by weight of the cross-linking agents per 100 parts by weight of the unsaturated polymer.

Each cross-linking agent has a characteristic decomposition temperature at which 50% of the cross-linking agent has decomposed when subjected to that temperature for a specified time period ($t_{1/2}$). For example, 1,1-bis-(t-butylperoxy)-3,3,5-tri-methylcyclohexane at $t_{1/2}$=0.1 hr has a decomposition temperature of 138° C. and 2,5-dimethyl-2,5-di-(t-butylperoxy)hexyne-3 at $t_{1/2}$=0.1 hr has a decomposition temperature of 182° C. Two or more cross-linking agents having different characteristic decomposition temperatures at the same $t_{1/2}$ may be blended in the composition. For example, where at least one cross-linking agent has a first characteristic decomposition temperature less than 150° C., and at least one cross-linking agent has a second characteristic decomposition temperature greater than 150° C., the composition weight ratio of the at least one cross-linking agent having the first characteristic decomposition temperature to the at least one cross-linking agent having the second characteristic decomposition temperature can range from 5:95 to 95:5, or more preferably from 10:90 to 50:50.

Besides the use of chemical cross-linking agents, exposure of the composition to radiation also can serve as a cross-linking agent. Radiation can be applied to the unsaturated polymer mixture by any known method, including using microwave or gamma radiation, or an electron beam device. Additives may also be used to improve radiation curing of the diene polymer.

The rubber and cross-linking agent may be blended with a co-cross-linking agent, which may be a metal salt of an unsaturated carboxylic acid. Examples of these include zinc and magnesium salts of unsaturated fatty acids having 3 to 8 carbon atoms, such as acrylic acid, methacrylic acid, maleic acid, and fumaric acid, palmitic acid with the zinc salts of acrylic and methacrylic acid being most preferred. The unsaturated carboxylic acid metal salt can be blended in a rubber either as a preformed metal salt, or by introducing an $\alpha,\beta$-unsaturated carboxylic acid and a metal oxide or hydroxide into the rubber composition, and allowing them to react in the rubber composition to form a metal salt. The unsaturated carboxylic acid metal salt can be blended in any desired amount, but preferably in amounts of about 10 parts to about 60 parts by weight of the unsaturated carboxylic acid per 100 parts by weight of the synthetic rubber.

The core compositions used in the present invention may also incorporate one or more of the so-called "peptizers". The peptizer preferably comprises an organic sulfur compound and/or its metal or non-metal salt. Examples of such organic sulfur compounds include thiophenols, such as pentachlorothiophenol, 4-butyl-o-thiocresol, 4 t-butyl-p-thiocresol, and 2-benzamidothiophenol; thiocarboxylic acids, such as thiobenzoic acid; 4,4' dithio dimorpholine; and, sulfides, such as dixylyl disulfide, dibenzoyl disulfide; dibenzothiazyl disulfide; di(pentachlorophenyl) disulfide; dibenzamido diphenyldisulfide (DBDD), and alkylated phenol sulfides, such as VULTAC marketed by Atofina Chemicals, Inc. of Philadelphia, Pa. Preferred organic sulfur compounds include pentachlorothiophenol, and dibenzamido diphenyldisulfide.

Examples of the metal salt of an organic sulfur compound include sodium, potassium, lithium, magnesium calcium, barium, and cesium and zinc salts of the above-mentioned thiophenols and thiocarboxylic acids, with the zinc salt of pentachlorothiophenol being most preferred.

Examples of the non-metal salt of an organic sulfur compound include ammonium salts of the above-mentioned thiophenols and thiocarboxylic acids wherein the ammonium cation has the general formula $[NR^1R^2R^3R^4]^+$ where $R^1$, $R^2$, $R^3$ and $R^4$ are selected from the group consisting of hydrogen, a $C_1$-$C_{20}$ aliphatic, cycloaliphatic or aromatic moiety, and any and all combinations thereof, with the most preferred being the $NH_4^+$-salt of pentachlorothiophenol.

Additional peptizers include aromatic or conjugated peptizers comprising one or more heteroatoms, such as nitrogen, oxygen and/or sulfur. More typically, such peptizers are heteroaryl or heterocyclic compounds having at least one heteroatom, and potentially plural heteroatoms, where the plural heteroatoms may be the same or different. Such peptizers include peptizers such as an indole peptizer, a quinoline peptizer, an isoquinoline peptizer, a pyridine peptizer, purine peptizer, a pyrimidine peptizer, a diazine peptizer, a pyrazine peptizer, a triazine peptizer, a carbazole peptizer, or combinations of such peptizers.

Suitable peptizers also may include one or more additional functional groups, such as halogens, particularly chlorine; a sulfur-containing moiety exemplified by thiols, where the functional group is sulfhydryl (—SH), thioethers, where the functional group is —SR, disulfides, ($R_1S$—$SR_2$), etc.; and combinations of functional groups. Such peptizers are more fully disclosed in U.S. Pat. No. 8,030,411 in the name of Hyun Kim et al, the entire contents of which are herein incorporated by reference. A most preferred example is 2, 3,5,6-tetrachloro-4-pyridinethiol (TCPT).

The peptizer, if employed in the golf balls of the present invention, is present in an amount up to about 10, from about 0.01 to about 10, preferably of from about 0.10 to about 7, more preferably of from about 0.15 to about 5 parts by weight per 100 parts by weight of the synthetic rubber component.

The core compositions can also comprise one or more accelerators of one or more classes. Accelerators are added to an unsaturated polymer to increase the vulcanization rate and/or decrease the vulcanization temperature. Accelerators can be of any class known for rubber processing including mercapto-, sulfenamide-, thiuram, dithiocarbamate, dithiocarbamyl-sulfenamide, xanthate, guanidine, amine, thiourea, and dithiophosphate accelerators. Specific commercial accelerators include 2-mercaptobenzothiazole and its metal or non-metal salts, such as Vulkacit Mercapto C, Mercapto MGC, Mercapto ZM-5, and ZM marketed by Bayer AG of Leverkusen, Germany, Nocceler M, Nocceler MZ, and Nocceler M-60 marketed by Ouchisinko Chemical Industrial Company, Ltd. of Tokyo, Japan, and MBT and ZMBT marketed by Akrochem Corporation of Akron, Ohio. A more complete list of commercially available accelerators is given in The Vanderbilt Rubber Handbook: $13^{th}$ Edition (1990, R.T. Vanderbilt Co.), pp. 296-330, in Encyclopedia of Polymer Science and Technology, Vol. 12 (1970, John Wiley & Sons), pp. 258-259, and in Rubber Technology Handbook (1980, Hanser/Gardner Publications), pp. 234-236. Preferred accelerators include 2-mercaptobenzothiazole (MBT) and its salts. The synthetic rubber composition can further incorporate from about 0.1 part to about 10 parts by weight of the accelerator per 100 parts by weight of the rubber. More preferably, the ball composition can further incorporate from about 0.2 part to about 5 parts, and most preferably from about 0.5 part to about 1.5 parts, by weight of the accelerator per 100 parts by weight of the rubber.

Typically the golf ball core is made by mixing together the unsaturated polymer, cross-linking agents, and other additives with or without melting them. Dry blending equipment, such as a tumbler mixer, V blender, ribbon blender, or two-roll mill, can be used to mix the compositions. The golf ball core compositions can also be mixed using a mill, internal mixer such as a Banbury or Farrel continuous mixer, extruder or combinations of these, with or without application of thermal energy to produce melting. The various core components can be mixed together with the cross-linking agents, or each additive can be added in an appropriate sequence to the milled unsaturated polymer. In another method of manufacture the cross-linking agents and other components can be added to the unsaturated polymer as part of a concentrate using dry blending, roll milling, or melt mixing. If radiation is a cross-linking agent, then the mixture comprising the unsaturated polymer and other additives can be irradiated following mixing, during forming into a part such as the core of a ball, or after forming.

The resulting mixture can be subjected to, for example, a compression or injection molding process, to obtain solid spheres for the core. The polymer mixture is subjected to a molding cycle in which heat and pressure are applied while the mixture is confined within a mold. The cavity shape depends on the portion of the golf ball being formed. The compression and heat liberates free radicals by decomposing one or more peroxides, which initiate cross-linking. The temperature and duration of the molding cycle are selected based upon the type of peroxide and peptizer selected. The molding cycle may have a single step of molding the mixture at a single temperature for fixed time duration.

For example, a preferred mode of preparation for the cores used in the present invention is to first mix the core ingredients on a two-roll mill, to form slugs of approximately 30-40 g, and then compression-mold in a single step at a temperature 150 to 180° C., for a time duration between 5 and 12 minutes.

The various core components may also be combined to form a golf ball by an injection molding process, which is also well known to one of ordinary skill in the art. The curing time depends on the various materials selected, and those of ordinary skill in the art will be readily able to adjust the curing time upward or downward based on the particular materials used and the discussion herein.

The various formulations for the intermediate layer and/or outer cover layer may be produced by any generally known method, such as dry blending, melt-mixing, or combination of those, to achieve a good dispersive mixing, distributive mixing, or both. Examples of melt-mixing are roll-mill; internal mixer, such as injection molding, single-screw extruder, twin-screw extruder; or any combination of those The feed to the injection mold may be blended manually or mechanically prior to the addition to the injection molder feed hopper. Finished golf balls may be prepared by initially positioning the solid, preformed core in an injection-molding cavity, followed by uniform injection of the intermediate layer and/or cover layer composition sequentially over the core. The cover formulations can be injection molded around the cores to produce golf balls of the required diameter.

Alternatively, the intermediate layers and/or outer cover layer may also be formed around the core by first forming half shells by injection molding followed by compression molding the half shells about the core to form the final ball.

The intermediate layers and/or outer cover layer may also be formed around the cores using compression molding. Cover materials for compression molding may also be extruded or blended resins or castable resins such as thermoset polyurethane or thermoset polyureas.

The aramid blend compositions used in the golf balls of the present invention may comprise from about 2 to about 40, preferably from about 5 to about 30 and more preferably from about 8 to about 20 wt % of an aramid polymer and from about 60 to about 98, preferably from about 70 to about 95 and more preferably from about 80 to about 92 wt % of one or more additional polymer components (all wt % based on the total weight of aramid polymer and additional polymer component(s)).

The aramid blend composition may be used in the core, intermediate layer(s), and/or cover layer of the golf ball. In certain embodiments, the aramid blend composition is the majority ingredient of the material used to form at least one structural component (e.g., the core, intermediate layer(s) or cover layer) of the golf ball. As used herein "majority ingredient" means that the aramid blend composition is present in an amount of at least about 50 wt %, particularly at least 60 wt %, and more particularly at least 80 wt %, based on the total weight of all the ingredients in the final material used to form at least one structural component.

The aramid may be used in solid form in the form of a powder or fiber, and the type of aramid polymer is selected based on the properties of the polymer component(s) to which it is to be added.

The additional polymer blend component may be a block copolymer, a unimodal ethylene/(meth)acrylic acid copolymer, a unimodal ethylene/(meth)acrylic acid/alkyl (meth) acrylate terpolymer, a bimodal ethylene/(meth)acrylic acid copolymer, a bimodal ethylene/(meth)acrylic acid/alkyl (meth)acrylate terpolymer, a unimodal ionomer, a bimodal ionomer, a modified unimodal ionomer, a modified bimodal ionomer, a polyalkenamer, a polyamide, a thermoplastic or thermoset polyurethane or thermoplastic or thermoset polyurea, or a multicomponent blend composition ("MCBC"), the MCBC comprising (A) a block copolymer; and (B) one or more acidic polymers; and (C) one or more basic metal salts present in an amount to neutralize at greater than or equal to about 30 percent of the acid groups of Component (B), and any and all combinations thereof.

The aramid blend compositions has a Melt Flow Index (MFI) hardness of from about 1 to about 80, preferably of from about 2 to about 60, more preferably of from about 3 to about 40 and most preferably of from about 4 to about 30 g/10 min.

The aramid blend compositions has a material hardness of from about 30 to about 90, preferably of from about 33 to about 80 more preferably of from about 36 to about 75 and most preferably of from about 40 to about 72 Shore D.

The aramid blend compositions has a flex modulus of from about 10 to about 120, preferably of from about 20 to about 100, more preferably of from about 40 to about 90 and most preferably of from about 50 to about 80 kpsi.

In one preferred aspect, the golf ball is a two-piece ball with the aramid blend compositions used in the outer cover layer.

In one preferred aspect, the golf ball is a multi-piece ball wherein the outer cover comprises the aramid blend compositions described herein.

In one preferred aspect, the golf ball is a multi-piece ball having at least one intermediate layers which comprises the aramid blend compositions described herein.

In another aspect the golf ball is a three-piece ball with the aramid blend compositions used in the intermediate or mantle layer and the outer cover layer a block copolymer, a unimodal ethylene/(meth)acrylic acid copolymer, a unimodal ethylene/(meth)acrylic acid/alkyl (meth)acrylate terpolymer, a bimodal ethylene/(meth)acrylic acid copolymer, a bimodal ethylene/(meth)acrylic acid/alkyl (meth)acrylate terpolymer, a unimodal ionomer, a bimodal ionomer, a modified unimodal ionomer, a modified bimodal ionomer, a polyalkenamer, a polyamide, a thermoplastic or thermoset polyurethane or thermoplastic or thermoset polyurea, or a multicomponent blend composition ("MCBC"), the MCBC comprising (A) a block copolymer; and (B) one or more acidic polymers; and (C) one or more basic metal salts present in an amount to neutralize at greater than or equal to about 30 percent of the acid groups of Component (B), and any and all combinations thereof.

In another aspect the golf ball is a four-piece ball with the aramid blend compositions used in one or more of the inner and outer intermediate layer and the outer cover layer comprises a block copolymer, a unimodal ethylene/(meth)acrylic acid copolymer, a unimodal ethylene/(meth)acrylic acid/alkyl (meth)acrylate terpolymer, a bimodal ethylene/(meth) acrylic acid copolymer, a bimodal ethylene/(meth)acrylic acid/alkyl (meth)acrylate terpolymer, a unimodal ionomer, a bimodal ionomer, a modified unimodal ionomer, a modified bimodal ionomer, a polyalkenamer, a polyamide, a thermoplastic or thermoset polyurethane or thermoplastic or thermoset polyurea, or a multicomponent blend composition ("MCBC"), the MCBC comprising (A) a block copolymer; and (B) one or more acidic polymers; and (C) one or more basic metal salts present in an amount to neutralize at greater than or equal to about 30 percent of the acid groups of Component (B), and any and all combinations thereof.

In another aspect the golf ball is a five-piece ball with the aramid blend compositions used in one or more of the intermediate or mantle layers and the outer cover layer comprises a block copolymer, a unimodal ethylene/(meth)acrylic acid copolymer, a unimodal ethylene/(meth)acrylic acid/alkyl (meth)acrylate terpolymer, a bimodal ethylene/(meth)acrylic acid copolymer, a bimodal ethylene/(meth)acrylic acid/alkyl (meth)acrylate terpolymer, a unimodal ionomer, a bimodal ionomer, a modified unimodal ionomer, a modified bimodal ionomer, a polyalkenamer, a polyamide, a thermoplastic or thermoset polyurethane or thermoplastic or thermoset polyurea, or a multicomponent blend composition ("MCBC"), the MCBC comprising (A) a block copolymer; and (B) one or more acidic polymers; and (C) one or more basic metal salts present in an amount to neutralize at greater than or equal to about 30 percent of the acid groups of Component (B), and any and all combinations thereof.

The golf ball of the present invention may comprise from 0 to 6, preferably from 0 to 5, more preferably from about 1 to about 4, most preferably from about 1 to about 3 intermediate layer(s).

The one or more intermediate layers of the golf balls may have a thickness of from about 0.010 to about 0.400, preferably from about 0.020 to about 0.200 and most preferably from about 0.030 to about 0.100 inches.

The one or more intermediate layers of the golf balls may also have a Shore D hardness as measured on the ball of greater than about 25, preferably greater than about 40, and most preferably greater than about 50 Shore D units.

The one or more intermediate layers of the golf balls also may have a hardness as measured on the ball greater than the hardness of core layer(s) by about 2 units of Shore D, preferably 4 units of Shore D, more preferably by 6 units of Shore D, and most preferably by 8 units of Shore D.

The outer cover layer of the balls may have a thickness of from about 0.015 to about 0.100, preferably from about 0.020 to about 0.080, more preferably from about 0.025 to about 0.060 inches.

The outer cover layer the balls may also have a Shore D hardness as measured on the ball of from about 30 to about 75, preferably from 38 to about 68 and most preferably from about 40 to about 65.

The core of the balls also may have a PGA compression of less than about 140, preferably less than about 100, and most preferably less than about 90.

The various core layers (including the center) if present may each exhibit a different hardness. The difference between the center hardness and that of the next adjacent layer, as well as the difference in hardness between the various core layers may be greater than 2, preferably greater than 5, most preferably greater than 10 units of Shore D.

In one preferred aspect, the hardness of the center and each sequential layer increases progressively outwards from the center to outer core layer.

In another preferred aspect, the hardness of the center and each sequential layer decreases progressively inwards from the outer core layer to the center.

The core of the balls may have a diameter of from about 0.5 to about 1.62, preferably from about 0.7 to about 1.60, more preferably from about 0.9 to about 1.58, yet more preferably from about 1.20 to about 1.54, and even more preferably from about 1.40 to about 1.50 in.

More specifically, for a three piece golf ball consisting of a core, a mantle, and a cover, the diameter of the core is most preferably greater than or equal to 1.41 inches in diameter.

More specifically, for a four piece golf ball (consisting of a core, an inner mantle, an outer mantle, and a cover wherein the inner mantle is encased by an outer mantle) the diameter of the core is most preferably greater than or equal to 1.00 inches in diameter.

More specifically, for a five piece golf ball (consisting of an inner core, an outer core, an inner mantle, an outer mantle, and a cover wherein the inner core and inner mantle are encased by outer core and outer mantle, respectively) the diameter of the core is most preferably greater than or equal to 1.00 inches in diameter.

The COR of the golf balls may be greater than about 0.700, preferably greater than about 0.730, more preferably greater than 0.750, most preferably greater than 0.775, and especially greater than 0.800 at 125 ft/sec inbound velocity.

The shear cut resistance of the golf balls of the present invention is less than about 4, preferably less than about 3, even more preferably less than about 2.

These and other aspects of the present invention may be more fully understood by reference to the following examples. While these examples are meant to be illustrative of golf balls and golf ball components made according to the present invention, the present invention is not meant to be limited by the following examples.

EXAMPLES

ESCOR5200 is an ethylene acrylic acid copolymer having an acrylic acid content of 15 wt % acid and is available from ExxonMobil SURLYN 8150 is an ethylene/methacrylic acid (E/MAA) copolymer, in which the MAA acid groups have been partially neutralized with sodium ions and is available from Du Pont.

SURLYN 9150 is an ethylene/methacrylic acid (E/MAA) copolymer, in which the MAA acid groups have been partially neutralized with zinc ions and is available from Du Pont.

TWARON 5011 is an aramid polymer powder with an average particle size of 55 microns and is available from Teijin Aramid TWARON D1088 is a 0.25 mm short fiber and is available from Teijin Aramid HG 252 is a styrenic copolymer available from Kuraray America Inc.

VESTENAMER is the polyoctenamer from Evonik

ZnO is Zinc Oxide from Lanxess.

ZDA12 (Zinc diacrylate) from Jinyang Chemical Co.

LUPEROX 231XL is 1,1 di(t-butylperoxy)-3,3,5-trimethyl-available from Arkema.

The various test properties which may be used to measure the properties of the golf balls of the present invention are described below including any test methods as defined below.

Core or ball diameter may be determined by using standard linear calipers or size gauge.

Compression may be measured by applying a spring-loaded force to the golf ball center, golf ball core, or the golf ball to be examined, with a manual instrument (an "Atti gauge") manufactured by the Atti Engineering Company of Union City, N.J. This machine, equipped with a Federal Dial Gauge, Model D81-C, employs a calibrated spring under a known load. The sphere to be tested is forced a distance of 0.2 inch (5 mm) against this spring. If the spring, in turn, compresses 0.2 inch, the compression is rated at 100; if the spring compresses 0.1 inch, the compression value is rated as 0. Thus more compressible, softer materials will have lower Atti gauge values than harder, less compressible materials. Compression measured with this instrument is also referred to as PGA compression. The approximate relationship that exists between Atti or PGA compression and Riehle compression can be expressed as:

(Atti or PGA compression)=(160−Riehle Compression).

Thus, a Riehle compression of 100 would be the same as an Atti compression of 60.

COR may be measured using a golf ball or golf ball subassembly, air cannon, and a stationary steel plate. The steel plate provides an impact surface weighing about 100 pounds or about 45 kilograms. A pair of ballistic light screens, which measure ball velocity, are spaced apart and located between the air cannon and the steel plate. The ball is fired from the air cannon toward the steel plate over a range of test velocities from 50 ft/s to 180 ft/sec (for the tests used herein the velocity was 125 ft/sec). As the ball travels toward the steel plate, it activates each light screen so that the time at each light screen is measured. This provides an incoming time period proportional to the ball's incoming velocity. The ball impacts the steel plate and rebounds though the light screens, which again measure the time period required to transit between the light screens. This provides an outgoing transit time period proportional to the ball's outgoing velocity. The coefficient of restitution can be calculated by the ratio of the outgoing transit time period to the incoming transit time period, $COR=T_{Out}/T_{in}$.

A "Mooney" viscosity is a unit used to measure the plasticity of raw or unvulcanized rubber. The plasticity in a Mooney unit is equal to the torque, measured on an arbitrary scale, on a disk in a vessel that contains rubber at a temperature of 100° C. and rotates at two revolutions per minute. The measurement of Mooney viscosity is defined according to ASTM D-1646.

Shore D hardness may be measured in accordance with ASTM Test D2240.

Melt flow index (MFI, 12) may be measured in accordance with ASTM D-1238, Condition 230° C./2.16 kg.

Flexural modulus and flexural strength were measured using ASTM standard D-790.

Tensile Strength and Tensile Elongation were measured with ASTM D-638.

Shear cut resistance may be determined by examining the balls after they were impacted by a pitching wedge at controlled speed, classifying each numerically from 1 (excellent) to 5 (poor), and averaging the results for a given ball type. Three samples of each Example may be used for this testing. Each ball is hit twice, to collect two impact data points per ball. Then, each ball is assigned two numerical scores—one for each impact—from 1 (no visible damage) to 5 (substantial material displaced). These scores may be then averaged for each Example to produce the shear resistance numbers. These numbers may be then directly compared with the corresponding number for a commercially available ball, having a similar construction including the same core and mantle composition and cover thickness for comparison purposes.

Impact durability may be tested with an endurance test machine. The endurance test machine is designed to impart repetitive deformation to a golf ball similar to a driver impact. The test machine consists of an arm and impact plate or club face that both rotate to a speed that generates ball speeds of approximately 155-160 mph. Ball speed is measured with two light sensors located 15.5" from impact location and are 11" apart. The ball is stopped by a net and if a test sample is not cracked will continue to cycle through the machine for additional impacts. For golf balls, if zero failures occur through in excess of 100 impacts per ball than minimal field failures will occur. For layers adjacent to the outer cover, fewer impacts are required since the cover typically "protects" the inner components of the golf ball.

Golf ball Sound Pressure Level, S, in decibels (dB) and Frequency in hertz (Hz) may be measured by dropping the ball from a height of 113 in onto a marble ("starnet crystal pink") stage of at least 12" square and 4.25 inches in thickness. The sound of the resulting impact is captured by a microphone positioned at a fixed proximity of 12 inches, and at an angle of 30 degrees from horizontal, from the impact position and resolved by software transformation into an intensity in db and a frequency in Hz. Data collection is done as follows:

Microphone data is collected using a laptop PC with a sound card. An A-weighting filter is applied to the analog signal from the microphone. This signal is then digitally sampled at 44.1 KHz by the laptop data acquisition system for further processing and analysis. Data Analysis was done as follows:

The data analysis is split into two processes:
a. Time series analysis that generates the root mean square (rms) sound pressure level (SPL) for each ball impact sound.
  i. An rms SPL from a reference calibration signal is generated in the same manner as the ball data.
  ii. The overall SPL (in decibels) is calculated from the reference signal for each ball impact sound.
  iii. The median SPL is recorded based on 3 impact tests.
b. Spectral analyses for each ball impact sound
  i. Fourier and Autoregressive spectral estimation techniques are employed to create power spectra.
  ii. The frequencies (in cycles/sec-Hz) from highest level peaks representing the most active sound producing vibration modes of each ball are identified.

Examples 1 and 2

Blend Preparation

A series of blends were prepared from a base of ESCOR5200 ethylene acrylic acid copolymer to which was added sufficient ZnO to neutralize 40% of the acid groups of the copolymer. Blends A1 and A2 involved the addition to Blend A of 5 pph of Twaron 5011 aramid polymer powder and Twaron D1088 aramid polymer short fiber respectively. Blend C was a control sample consisting of a 50/50 wt % blend of Surlyn 8150 and Surlyn 9150 ethylene/methacrylic acid ionomers. In all cases the blends were prepared using twin screw extruder using a barrel temperature of 150° C.~280° C., a screw speed of 150~350 rpm, and a feed rate of 120~250 g/min.

The various blend composition and physical test data are summarized in Table 1. Analysis of these data demonstrate that, for Blends A and A1, addition of 5 pph of the aramid polymer powder, Twaron 5011, results in an increase in flexural modulus ("FM") and flexural strength ("FS") of the resulting blend. The same directional effect on FM and FS is also observed by the addition of the 5 pph of the aramid fiber Twaron D1088, as shown by further comparisons with the results for blend A2. However a synergistic effect is also observed by the use of the aramid fiber versus the aramid powder in that for blend A2 the increases in FM and FS are even more pronounced than those of blend A1. It is also important to note that even in the presence of the improvements in FS and FM, the hardness of the material is not greatly affected by the addition of the aramid polymer powder of fiber, presumably due to the small amounts employed.

Finally, the final properties of the of the blends with the aramid fiber (A2 and A3) are similar in terms of FM and FS as those achieved by a 50/50 blend of two high flex modulus ionomers, Surlyn 8150 and Surlyn 9150, but this blend exhibits a higher Shore D hardness.

TABLE 1

Blends of Aramid Fiber and Aramid Powder with Mid Acid Ionomer Material Properties

| Blend Composition | A | A1 | A2 | B |
|---|---|---|---|---|
| ESCOR 5200 (pph) | 100 | 100 | 100 | |
| ZnO (to give % neutralization) | x (40%) | x (40%) | x (40%) | |
| Surlyn 8150 (pph) | | | | 50 |
| Surlyn 9150 (pph) | | | | 50 |
| Twaron 5011 (pph) | | 5 | | |
| Twaron D1088 (pph) | | | 5 | |
| MFI | 12.9 | 10.7 | 9.2 | |
| 2 weeks of Aging | | | | |
| FS (psi) | 437 | 502 | 661 | 587 |
| FM (kpsi) | 50.5 | 57.7 | 76.2 | 73 |
| Shore D | 61.4 | 63.5 | 63.5 | 65.7 |

Golf Ball Preparation

A series of five-piece balls were then prepared as follows in each case using the blend compositions of Table 1 as the outer mantle:

The cores were made by the standard process that includes mixing the core material in a two roll mill, extruding the mixture, and then forming and curing the cores under heat and pressure in a compression molding cycle. The outer core layers were made by injection molding followed by curing under heat and pressure in a compression molding cycle. The inner and outer mantle layers were all made by injection molding. The urethane cover layers were made by proper mixing of two curatives using a urethane dispenser. The FlackTek high speed mixer was used for uniform mixing of prepolymer and curative mixture, and then the mixture was poured into the cavities for molding. The molding temperature and cycle was 55° C. and 7 min., respectively.

TABLE 2

Ball Performance of Balls with Outer Mantle of Blends of Aramid Fiber and Aramid Powder with Mid Acid Ionomer Material Properties

| | Comp Ex. 1 | Ex. 1 | Comp Ex. 2 | Comp Ex 3 (Penta TP) |
|---|---|---|---|---|
| Ball Construction | | | | |
| 1.26" Core | x | x | x | |
| 1.38" Outer Core | x | x | x | |
| 1.50" Inner Mantle | x | x | x | |
| 1.60" Outer Mantle (Composition) | A | A2 | B | |
| 1.68" Urethane Cover | x | x | x | |
| Endurance | 1@250, 2@275 | 1@315, 1@327, 2@350 | 1@190, 3@208 | |
| Ball Performance | | | | |
| Driver Speed (mph) | 158.1 | 158 | 158 | 159.7 |
| Spin Rate (rpm) | 2721 | 2644 | 2818 | 2876 |
| Driver Speed (mph) | 172 | 173.2 | 173.1 | 174.4 |
| Spin Rate (rpm) | 2905 | 2923 | 2981 | 2823 |
| 8-Iron Spin Rate (rpm) | 7348 | 7031 | 7433 | 7247 |
| 30 yd PW Spin Rate (rpm) | 7123 | 7085 | 6981 | 7110 |
| Acoustics, Freq (Hz) | 3340 | 3420 | 3430 | 3540 |

Analysis of the data in Table 2 show that for the same ball construction inclusion of the 5 pph of the aramid polymer fiber in the outer mantle of Example 1 results in a dramatic improvement in endurance as compared to that of the analogous ball but with any aramid polymer fiber in the outer mantle (Comp Ex 1). Comparison of these data with those for Comp Ex 2 show that the Endurance of the aramid modified balls are much greater than those observed when the 50/50 blend of two high flex modulus ionomers, Surlyn 8150 and Surlyn 9150 were employed as the outer mantle.

It should also be noted that the resulting ball performance in all cases, the inclusion of the aramid polymer while clearly increasing endurance, has no detrimental effect on ball spin rate properties as measured either using a driver at both 160 and 175 mph driver speed or for the 8 iron or pitching wedge ("PW") shots, or on the "feel" of the golf ball when hit as measured by the acoustical frequency.

Finally, comparison of the final ball performance properties of the aramid modified golf balls of Example 1 with those of Comparative Ex's 2 and 3 demonstrate that these performance properties are well within the range of those observed for commercially available urethane-covered golf balls, the PENTA from Taylor Made Golf Company.

Examples 3-5

Blend Preparation

A series of blends were prepared from a multi-component blend composition were prepared from an in-situ blend of 48 parts of ESCOR5200 ethylene acrylic acid copolymer and 52 parts SEPTON HG 252 to which was added in situ sufficient ZnO to neutralize 83% of the acid groups of the ESCOR5200. Blend D contained no further components while Blends D1, D2 and D3 contained 3, 5 and 10 pph of the aramid polymer fiber, Twaron D1088 respectively. In all cases the blends were prepared using twin screw extruder using a barrel temperature of 150° C.~280° C., a screw speed of 150~350 rpm, and a feed rate of 120~250 g/min. The various blend compositions and physical test data are summarized in Table 3.

TABLE 3

Blends of Aramid Fiber and Aramid Powder with a Multi Component Blend ("MCB") Material Properties

| Blend Composition | C | C1 | C2 | C3 |
|---|---|---|---|---|
| ESCOR 5200 (pph) | 48 | 48 | 48 | 48 |
| SEPTON HG 252 (pph) | 52 | 52 | 52 | 52 |
| ZnO (% neutralization) | x (83%) | x (83%) | x (83%) | x (83%) |
| Twaron D1088 (pph) | | 3 | 5 | 10 |
| Surlyn 8150 (pph) | | | | |
| Surlyn 9150 (pph) | | | | |
| MFI | 11.5 | 6.3 | 5.7 | 4.2 |
| 2 weeks of Aging | | | | |
| FM (kpsi) | 21.6 | 24.6 | 26.2 | 29.5 |
| Shore D | 42.9 | 44.2 | 44.7 | 46.5 |
| FS (psi) | 187 | 210 | 222 | 253 |

Analysis of these data demonstrates that addition of the aramid fiber Twaron D1088 again results in an increase in flexural modulus and flexural strength.

Golf Ball Preparation

A series of five-piece balls were then prepared as follows in each case using the blend compositions of Table 3 but this time as the outer cover of the golf ball.

The cores were made by the standard process that includes mixing the core material in a two roll mill, extruding the mixture, and then forming and curing the cores under heat and pressure in a compression molding cycle. The outer core layers were made by injection molding followed by curing under heat and pressure in a compression molding cycle. The inner and outer mantle and cover layers were all made by injection molding.

TABLE 4

Ball Performance of Five-Piece Balls with Outer Mantle of Blends of Aramid Fiber and Aramid Powder with a Multi Component Blend ("MCB")

| | Comp Ex 5 | Ex 3 | Ex 4 | Ex 5 | Comp Ex 6 (Penta) | Comp Ex 8 (TP Black) |
|---|---|---|---|---|---|---|
| 1.26" Core | x | x | x | x | | |
| 1.38" Outer Core | x | x | x | x | | |
| 1.50" Inner Mantle | x | x | x | x | | |
| 1.60" Outer Mantle (composition) | C | C | C | C | | |
| 1.68" Cover (composition) | C | C1 | C2 | C3 | | |
| Core Compression (PGA) | 89 | 90 | 91 | 92 | | |
| COR (125 ft/s) | 0.805 | 0.803 | 0.802 | 0.803 | | |
| Shore D | 54.4 | 54.5 | 54.8 | 55 | | |
| Shear (Standard) | 4 | 3.5 | 4 | 4.6 | 2 | 2 |
| 175 mph spin (rpm) | 2887 | 2844 | 2768 | 2576 | 2529 | 2572 |
| 175 mph actual speed | 172.5 | 172.3 | 172.2 | 172.6 | 173 | 174.8 |

Analysis of the data in Table 4 show that the incorporation of the aramid fiber as in Examples 34 and 5 results in a progressive decrease in driver spin as compared to the analogous ball but without the aramid fiber addition to the cover material (Comp Ex 5). The reduction in driver spin is sufficient to bring it to the level observed for commercially successful balls including the Taylor Made PENTA TP, the Titleist NXT Tour and the Taylor Made TP Black (Comparative Examples 6, 7 and 8 respectively) while exhibiting improved shear performance.

Example 6

Blend Preparation

A series of blends were prepared from a polyakenamer, VESTENAMER, formulation with a crosslinking package of zinc oxide, zinc diacrylate and peroxide. Blend E contained no further components while Blends E1-E9 contained varying amounts of the aramid polymer fiber, Twaron D1088, and varying amount of zinc diacrylate. In all cases the blends were prepared using a two roll mill and then forming and curing the compositions under heat and pressure in a compression molding cycle. The various blend compositions and physical test data are summarized in Table 5

Comparison of Blend E with blends E1-E7 in Table 5 show that addition of the aramid fiber results in increase in material hardness and compression of the blend but lowers its COR. This increase in compression then allows for (at the same aramid fiber content) the reduction on ZDA crosslinking agent in the Vestenamer crosslinking package to bring compression back to its original value while lowering the material Shore D hardness which results in improved processability of the blend when used in ball manufacture.

Golf Ball Preparation

Two three-piece balls were then prepared as follows in each case using a Vestenamer blend composition for the intermediate layer (Comp Ex 9) and the analogous ball made with the same mantle blend but containing 30 pph of the aramid polymer fiber, Twaron D1088. The cores were made by the standard process that includes mixing the core material in a two roll mill, extruding the mixture, and then forming and curing the cores under heat and pressure in a compression molding cycle. The mantle layers were made by injection molding followed by curing under heat and pressure in a compression molding cycle. The cover layers were all made by injection molding.

TABLE 5

Blends of Aramid Fiber with Vestanamer Material Properties

| | E | E1 | E3 | E7 | E6 | E5 | E2 | E4 | E9 | E8 |
|---|---|---|---|---|---|---|---|---|---|---|
| Vestenamer (pph) | 100 | 100 | 100 | 100 | 100 | 100 | 100 | 100 | 100 | 100 |
| ZnO (pph) | 5 | 5 | 5 | 5 | 5 | 5 | 5 | 5 | 5 | 5 |
| ZDA12 | 61 | 61 | 61 | 61 | 65 | 43 | 52 | 52 | 52 | 52 |
| Twaron D1088 (pph) | | 20 | 25 | 30 | 30 | 25 | 20 | 25 | 30 | 30 |
| Luperox 231XL (pph) | 1 | 1 | 1 | 1 | 1 | 1 | 1 | 1 | 1 | 1 |
| PGA Compression | 110 | 142 | 150 | 147 | 151 | 130 | 129 | 129 | 129 | 142 |
| COR (125 ft/s) | 0.787 | 0.771 | 0.773 | 0.744 | 0.755 | 0.766 | 0.769 | 0.769 | 0.725 | 0.74 |
| Shore D | 59.3 | 67 | 69.8 | 70.1 | 71.7 | 64.6 | 60.7 | 65 | 66.7 | 68.6 |
| Specific Gravity | 1.11 | 1.16 | 1.17 | 1.178 | 1.19 | 1.15 | 1.13 | 1.14 | 1.159 | 1.173 |

TABLE 6

Ball Performance of Three-Piece Balls with Mantle of Blends of Aramid Fiber with Polyalkenamer

| | Ex 6 | Comp Ex 9 | Comp Ex 10 (Penta$^{TP}$) | Comp Ex 11 (TP Black) |
|---|---|---|---|---|
| Vestenamer | 100 | 100 | | |
| ZnO | 5 | 5 | | |
| ZDA12 | 65 | 65 | | |
| Twaron D1088 (pph) | 30 | | | |
| Luperox 231XL | 1 | 1 | | |
| 1.48" Core | x | x | | |
| 1.60" Mantle | B | A | | |
| 1.68" Ionomer Cover | x | x | | |
| Endurance | 1@200, 1@211, 1@262, 1@281 | 2@8, 8@7 | | |
| Spin at ~160 mph driver speed (rpm) | 2647 | 2584 | 2776 | 2720 |
| Actual speed (mph) | 162 | 162 | 159.8 | 160.5 |
| Spin at ~175 mph driver speed (rpm) | 2441 | 2534 | 2665 | 2680 |
| Actual speed (mph) | 176.5 | 176.6 | 176 | 176.3 |

Analysis of the data in Table 6 show that the incorporation of the aramid fiber as in Example 6 results in a decrease in driver spin at the higher driver speed of 175 mph to even lower levels than as compared to the analogous ball but without the aramid fiber addition to the cover material (Comp Ex 9). The reduction in driver spin is sufficient to bring it to the level observed for commercially successful balls including the Taylor Made PENTA$^{TP}$ and the Taylor Made TP Black (Comparative Examples 10 and 11 respectively).

We claim:

1. A golf ball comprising;
   I a core;
   II one or more intermediate layers; and
   III an outer cover layer, and
wherein said one or more intermediate layers comprises a blend composition comprising;
   A from about 5 to about 30 wt % (based on the total weight of the blend composition) of an aramid polymer having the general formula

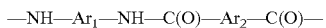
   —NH—Ar$_1$—NH—C(O)—Ar$_2$—C(O)— wherein Ar$_1$ and Ar$_2$ independently represent p-phenylene, m-phenylene, halogen-substituted p-phenylene, halogen-substituted m-phenylene, 4,4-substituted diphenyl methane, or mixtures thereof; and
   B from about 70 to about 95 wt % (based on the total weight of the blend composition) of one of more additional blend component which is selected from the group consisting of a block copolymer, a unimodal ethylene/(meth)acrylic acid copolymer, a unimodal ethylene/(meth)acrylic acid/alkyl (meth)acrylate terpolymer, a bimodal ethylene/(meth)acrylic acid copolymer, a bimodal ethylene/(meth)acrylic acid/alkyl (meth)acrylate terpolymer, a unimodal ionomer, a bimodal ionomer, a modified unimodal ionomer, a modified bimodal ionomer, a polyalkenamer, a polyamide, a thermoplastic or thermoset polyurethane or thermoplastic or thermoset polyurea, or a multicomponent blend composition ("MCBC"), the MCBC comprising (A) a block copolymer; and (B) one or more acidic polymers; and (C) one or more basic metal salts present in an amount to neutralize at greater than or equal to about 30 percent of the acid groups of Component (B), and any and all combinations thereof; and wherein said blend composition has;
   i a melt flow index (MFI) of from about 3 to about 40 g/10 min.;
   ii a material hardness of from about 36 to about 75 Shore D; and
   iii a flex modulus of from about 40 to about 90 kpsi.

2. The golf ball of claim 1 wherein said blend composition comprises;
   A from about 8 to about 20 wt % (based on the total weight of the blend composition) of said aramid polymer is selected from the group consisting of poly(para-phenyleneterephthalamide), poly(meta-phenyleneisophthalamide), and any and all copolymers and combinations thereof; and
   B from about 80 to about 92 wt % (based on the total weight of the blend composition) of said additional blend component which is selected from the group consisting of a block copolymer, a unimodal ionomer, a bimodal ionomer, a modified unimodal ionomer, a modified bimodal ionomer, a polyalkenamer, a multicomponent blend composition ("MCBC") comprising (A) a block copolymer; and (B) one or more acidic polymers; and (C) one or more basic metal salts present in an amount to neutralize at greater than or equal to about 30 percent of the acid groups of Component (B) and any and all combinations thereof; and
wherein said blend composition has;
   i a melt flow index (MFI) of from about 4 to about 30 g/10 min.;
   ii a material hardness of from about 40 to about 72 Shore D; and
   iii a flex modulus of from about 50 to about 80 kpsi.

3. The golf ball of claim 1 wherein said core;
   a has a diameter of from about 0.5 to about 1.62 inches;
   b has a PGA compression of less than about 100; and
   c comprises a peptizer selected from the group consisting of an organic sulfur compound, a metal salt of an organic sulfur compound, a non-metal salt of an organic sulfur compound, and any and all combinations thereof.

4. The golf ball of claim 1 wherein said core;
   a has a diameter of from about 0.9 to about 1.58 inches;
   b has a PGA compression of less than about 90; and
   c further comprises one or more core layers each exhibiting a different hardness wherein the difference in hardness between each core layer is greater than 5 units of Shore D.

5. A three piece golf ball consisting essentially of;
   I a core;
   II an outer cover layer having a thickness of from about 0.020 to about 0.080 inches and a Shore D hardness as measured on the ball of from about 38 to about 68, and
   III an intermediate layer having a thickness of from about 0.02 to about 0.200 inches and a Shore D hardness as measured on the ball of greater than about 40; and
   wherein said intermediate layer comprises a blend composition comprising;
      A from about 5 to about 30 wt % (based on the total weight of the blend composition) of said aramid polymer having the general formula

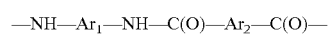
      —NH—Ar$_1$—NH—C(O)—Ar$_2$—C(O)— wherein Ar$_1$ and Ar$_2$ independently represent p-phenylene, m-phenylene, halogen-substituted p-phenylene, halogen-substituted m-phenylene, 4,4-substituted diphenyl methane, or mixtures thereof; and B from about 70 to about 95 wt % (based on the total weight of the blend composition) of said additional blend component which is selected from the group consisting of a block copolymer, a unimodal ethylene/(meth)acrylic acid copolymer, a unimodal ethylene/(meth)acrylic acid/alkyl (meth)acrylate terpolymer, a bimodal ethylene/(meth)acrylic acid copolymer, a bimodal ethylene/(meth)acrylic acid/alkyl (meth)acrylate terpolymer, a unimodal ionomer, a bimodal ionomer, a modified unimodal ionomer, a modified bimodal ionomer, a polyalkenamer, a polyamide, a thermoplastic or thermoset polyurethane or thermoplastic or thermoset polyurea, or a multicomponent blend composition ("MCBC"), the MCBC comprising (A) a block copolymer; and (B) one or more acidic polymers; and (C) one or more basic metal salts present in an amount to neutralize at greater than or equal to about 30 percent of the acid groups of Component (B), and any and all combinations thereof; and wherein said blend composition has;
   i a melt flow index (MFI) of from about 3 to about 40 g/10 min.;
   ii a material hardness of from about 36 to about 75 Shore D; and
   iii a flex modulus of from about 40 to about 90 kpsi.

6. The three piece golf ball of claim 5 wherein said core;
a has a diameter greater than or equal to 1.41 inch;
b has a PGA compression of less than about 140; and
c comprises a peptizer selected from the group consisting of an organic sulfur compound, a metal salt of an organic sulfur compound, a non-metal salt of an organic sulfur compound, and any and all combinations thereof.

* * * * *